United States Patent [19]

Horner et al.

[11] Patent Number: 5,721,630
[45] Date of Patent: Feb. 24, 1998

[54] HIGH-EFFICIENCY REFLECTIVE HOLOGRAPHIC DIFFUSER AND METHOD FOR MAKING THEREOF

[75] Inventors: M. Glenn Horner, West Roxbury; David A. Waldman, Acton, both of Mass.

[73] Assignee: Polaroid Corporation, Cambridge, Mass.

[21] Appl. No.: 614,035

[22] Filed: Mar. 12, 1996

[51] Int. Cl.$^6$ .............................. G02B 5/32; G03H 1/10; G03H 1/02; G03H 1/04
[52] U.S. Cl. .............................. 359/15; 359/10; 359/28; 430/1; 430/2
[58] Field of Search ............................ 359/1, 10, 15, 359/28; 430/1, 2

[56] References Cited

U.S. PATENT DOCUMENTS

| | | | |
|---|---|---|---|
| 3,909,111 | 9/1975 | Meyerhofer | 350/117 |
| 4,586,781 | 5/1986 | Gunther et al. | 350/3.7 |
| 4,588,664 | 5/1986 | Fielding et al. | 430/1 |
| 4,602,843 | 7/1986 | Glaser-Inbari | 350/3.7 |
| 4,642,736 | 2/1987 | Masuzawa et al. | 362/31 |
| 4,995,685 | 2/1991 | Armstrong et al. | 350/3.65 |
| 5,046,793 | 9/1991 | Hockley et al. | 359/12 |
| 5,253,086 | 10/1993 | Lungershausen et al. | 359/10 |
| 5,365,354 | 11/1994 | Jannson et al. | 359/15 |
| 5,418,631 | 5/1995 | Tedesco | 359/15 |
| 5,449,597 | 9/1995 | Sawyer | 430/523 |
| 5,471,327 | 11/1995 | Tedesco et al. | 359/15 |
| 5,534,386 | 7/1996 | Petersen et al. | 430/320 |

FOREIGN PATENT DOCUMENTS

| | | |
|---|---|---|
| 348137A2 | 12/1988 | European Pat. Off. . |
| 333644 | 9/1989 | European Pat. Off. . |
| WO95/12826 | 5/1995 | WIPO . |

OTHER PUBLICATIONS

PCT International Search Report for PCT/US97/03841 (Forms PCT/ISA/210 and 220) (mailed Sep. 7, 1997).
A.G. Chen et al., "Holographically Reflective Liquid Crystal Display", SID 1995 Symposium Proceedings (May 23, 1995).
M. Wenyon and P. Ralli, "Mass Production of Volume Holographic Diffusers", SID 1994 Symposium Digest of Technical Papers (Jun. 14–16, 1994) (ISSN 0097-966X).

*Primary Examiner*—Paul M. Dzierzynski
*Assistant Examiner*—Audrey Chang
*Attorney, Agent, or Firm*—Renato M. de Luna

[57] ABSTRACT

A high-efficiency holographic diffuser is provided, the holographic diffuser being comparatively thin, yet characterized by good optical density along a broad bandwidth. In particular, the high-efficiency holographic diffuser comprises a light-transmissive substrate; and a planar hologram layer, the planar hologram layer having an interference pattern holographically recorded therein, the interference pattern producing a diffuse light pattern in reflection when irradiated with light, the interference pattern being resultant of the combination of an incident wavefront and a counterpropagating wavefront substantially coherent with the incident wavefront, the incident coherent wavefront having impinged upon the planar hologram layer from a first side, the counterpropagating coherent wavefront having impinged upon the planar hologram layer from a second side opposite the first side, the incident coherent wavefront being a diffused coherent wavefront, the counterpropagating coherent wavefront also being a diffused coherent wavefront. The high-efficiency holographic diffuser can be formed by diffusing a coherent wavefront prior to its incidence on a holographic recording medium, transmitting the diffused wavefront through the holographic recording medium, then reflecting the transmitted diffused wavefront with a highly reflective optical element back through the holographic recording medium.

14 Claims, 17 Drawing Sheets

OTHER PUBLICATIONS

S. Wadle et al., "Holographic Diffusers", Optical Engineering, vol. 33, No. 1, pp. 213–214 (Jan. 1994).

J. M. Tedesco et al. "Holographic Diffusers for LCD Backlight and Projection Screens", SID 1993 Digest, Ch. 5.3, pp. 29–32 (1993).

D. Meyerhofer, "Holographic and Interferometric Viewing Screens", Applied Optics, vol. 12, No. 9, pp. 2180–2184 (Sep. 1973).

V.I. Lokshin et al., "Investigation of Ampiltude and Phase Holograms of Diffuse Objects", OPT. Spectrosc., vol. 36, No. 5, pp. 590–593 (May 1974).

C. Kurtz, "Copying Reflection Holograms", Journal of The Optical Society of America, vol. 58, pp. 856–857 (Jun. 1968).

HIGH-EFFICIENCY REFLECTIVE HOLOGRAPHIC DIFFUSER AND METHOD FOR MAKING THEREOF

FIELD OF THE INVENTION

In general, the present invention is directed to holographic diffusers useful for diffusing light in, for example, liquid crystal displays. More particularly, the present invention is directed to a volume-phase reflective holographic diffuser having an interference pattern holographically recorded therein, the interference pattern being a product of the combination of a diffused incident coherent wavefront and a diffused counterpropagating coherent wavefront.

BACKGROUND

Diffusers are used to scatter light such that an object within the resultant diffuse light pattern is illuminated uniformly by light propagating from a substantially increased number of angular directions.

Conventional diffusers are typically made from glass panes or plastic sheets, processed to have a light scattering surface, and/or impregnated with dispersed light scattering particles. A typical diffuser might be the light-transmissive shell of a frosted light bulb, or a ground glass plate or other rough surface facing a light source for the diffuse reflection of light originating therefrom. Conventional diffusers have been used in the display industry, for example, to define the quality (cf., angular distribution) and quantity (cf., brightness) of image light available to a viewer.

Important parameters considered in the design of a diffuser (especially those used in LCD units) are the uniformity of the projection of light transmitted or reflected in two dimensions, the efficiency of transmission or reflection as a function of wavelength over the visible wavelength region, and the solid angle of view for which the diffuser is operational. Conventional diffusers are generally limited in their capacity to accomplish desirable results in any one of these parameters without some sacrifice to the others. Holographic diffusers—having good forward scattering properties—are not so limited, and are lighter, more compact, and can generally be formed and replicated with comparatively greater ease. A holographic diffuser can provide high uniformity, high efficiency (with minimum backscatter), and a controllable solid angle of view largely independent of incident angle.

Conventional holographic diffusers are formed by imaging with a constructive interference pattern of coherent and diffuse light sources. Convenional attempts to maximize the efficiency of holographic diffusers almost invariably target the identification of a particular and appropriate ratio of object and reference beam intensities (hereinafter "beam intensity ratio"). Early basis for such strategy is found in the seminal and oft-cited article: V. I. Lokshin et al., *Investigation of Amplitude and Phase Holograms of Diffuse Objects*, OPT. SPECTROSC., Vol. 36, No. 5, pp. 590–593 (May 1974).

As reported, Lokshin et al. conducted experimental investigations to determine the diffraction efficiency and signal/noise ratio for two-dimensional amplitude and phase holograms of diffuse objects. Throughout the investigations, transmissive holographic diffusers were produced utilizing an exposure geometry involving a diffused object beam and an undiffused reference beam. Lokshin et al. concluded from this study that the diffraction efficiency of a holographic diffuser is primarily a function of beam intensity ratio.

By the present disclosure, it is submitted—without discrediting any possible correlation between holographic diffraction efficiency and beam intensity ratio—that the holographic interference pattern (whether of the reflective or transmissive variety) produced by merging the mismatched beam profiles of a diffused object beam and an undiffused reference beam will effect poor fringe visibility, and thereby effect reduced diffraction efficiency. Reduction is believed to occur independently of any gains potentially available through the manipulation of beam intensity ratio.

Thus, in departure from the central teaching of Lokshin et al., the present invention contemplates high-efficiency holographic diffusers produced by holographic exposure geometries effecting "matched beam profiles", rather than "mismatch-producing beam profiles". To produce such high-efficiency holographic diffusers, exposure is occasioned by use of coherent incident and counterpropagating wavefronts of substantially equivalent beam profiles, i.e., both wavefronts are diffused.

SUMMARY

In general, a high-efficiency holographic diffuser is provided, the holographic diffuser characterized by a set of well-defined refractive index modulations, which is resultant from an exposure to coherent incident and counterpropagating wavefronts of substantially equivalent beam profiles.

In particular, the high-efficiency holographic diffuser comprises a light-transmissive substrate; and a planar hologram layer, the planar hologram layer having an interference pattern holographically recorded therein, the recorded interference pattern producing a diffuse light pattern in reflection when irradiated with light, the interference pattern being a product of the combination of an incident wavefront and a counterpropagating wavefront substantially coherent with said incident wavefront, the incident coherent wavefront having impinged upon the planar hologram layer from a first side, the counterpropagating coherent wavefront having impinged upon the planar hologram layer from a second side opposite the first side, the incident coherent wavefront being a diffused coherent wavefront, the counterpropagating coherent wavefront also being a diffused coherent wavefront.

With regard to method aspects of the present invention, the holographic diffuser can be formed by diffusing a coherent wavefront prior to its incidence on a holographic recording medium, transmitting the diffused wavefront through the holographic recording medium, then reflecting the transmitted diffused wavefront with a highly reflective optical element back through the holographic recording medium.

In light of the above, it is a principal object of the present invention to provide a high-efficiency reflective holographic diffuser and a method for the manufacture thereof.

It is another object of the present invention to provide a high-efficiency reflective holographic diffuser produced by a methodology which effects substantially "matched" exposure beam profiles, producing well-defined fringe visibility.

BRIEF DESCRIPTION OF THE DRAWINGS

The present invention will be further illustrated with reference to the accompanying drawings; wherein FIG. 1 schematically illustrates in pertinent part the general exposure geometry used for making a reflective holographic diffuser according to the present invention.

DETAILED DESCRIPTION OF OF THE INVENTIVE SUBJECT MATTER

By the present invention, there is provided a high-efficiency, volume-phase, reflective holographic diffuser 10. As discussed further below, the reflective holographic diffuser 10 can be used, for example, in non-backlit liquid crystal display elements (see e.g., International Patent Application No. PCT/US94/11818 of A. G. Chen et al., published May 11, 1995, as International Publication No. WO 95/12826) or edge-lit liquid crystal display elements (see e.g., U.S. Pat. No. 5,418,631, issued to J. M. Tedesco on May 23, 1995), as well as other like electrooptical device (including electrochromic, electrophoretic, electrolytic, and the like), or other displays capable of providing an image viewable by the transmission of light therethrough (see e.g., U.S. patent application Ser. No. 08/448,747, filed May 24, 1995, by M. M. Wenyon).

Figure 1:
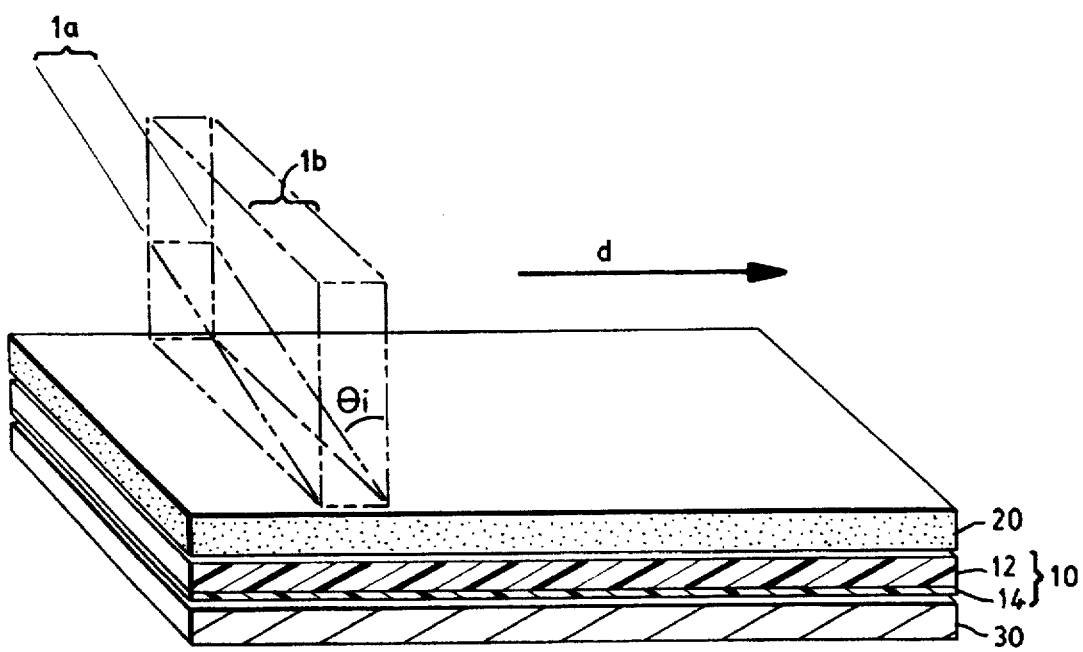

In general, the high-efficiency reflective holographic diffuser 10, shown in FIG. 1, comprises a light-transmissive substrate 12 and a planar hologram layer 14. The planar hologram layer has an interference pattern holographically recorded therein. The interference pattern produces a diffuse light pattern in reflection when irradiated with light.

In accordance with the present invention, the interference pattern is a product of the combination of an incident wavefront and a counterpropagating wavefront substantially coherent with said incident wavefront, the incident coherent wavefront having impinged upon the planar hologram layer 14 from a first side, the counterpropagating coherent wavefront having impinged upon the planar hologram layer 14 from the side opposite the first, and most importantly, the incident coherent wavefront and counterpropagating coherent wavefront both being substantially coherent diffuse wavefronts. As noted above, the matched beam profiles of the merging wavefronts produce well-defined interference fringes, which contribute to high efficiency in the inventive diffusers. A comparison of the efficiency of the reflective holographic diffuser according to the present invention and those of conventional design is presented in FIG. 2.

Figure 2:
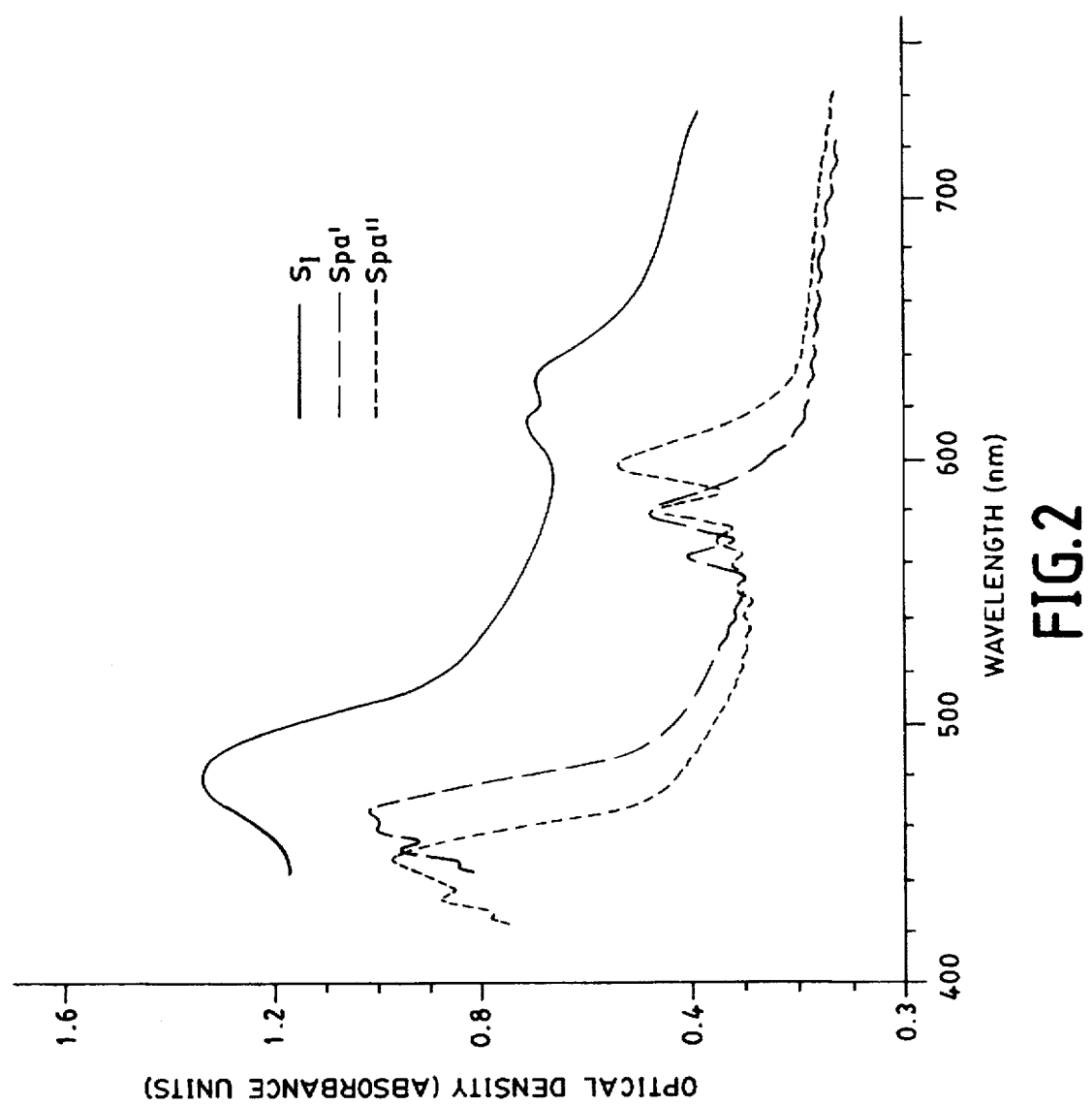
FIG. 2 is a graph showing optical density in absorbance units plotted against wavelength (nm) for reflective holographic diffusers, sequentially imaged at normal incidence with light from Kr ion (647 nm) and Ar ion (514 nm) lasers, at a writing power of 100 mW, where a glass diffuser precedes (exposure-wise) a DMP-128 holographic medium according to the present invention ($S_i$), and where the glass diffuser is positioned after the DMP-128 holographic recording media ($S_{pa'}$ and $S_{pa''}$)
Figure 3:
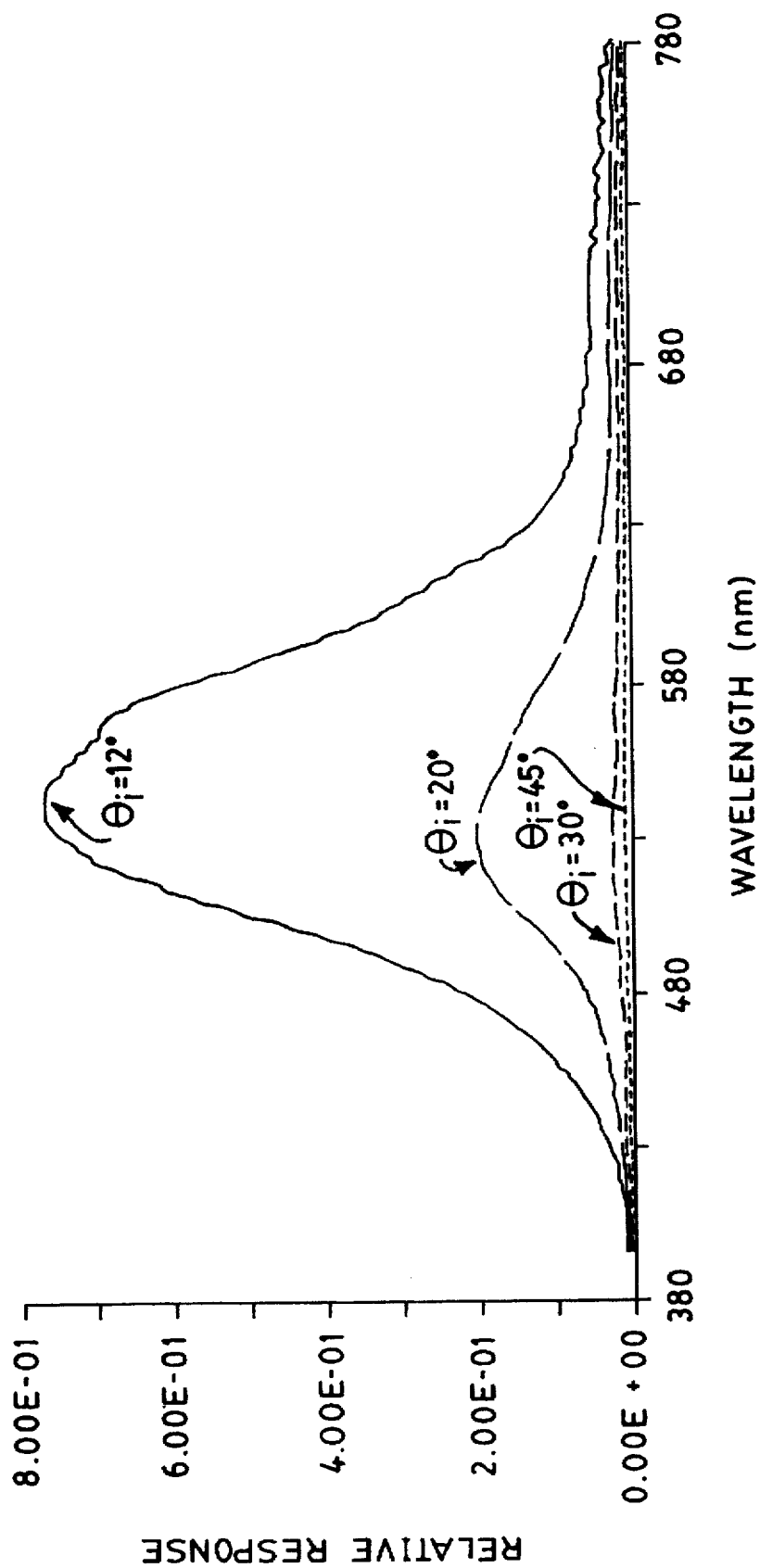
FIG. 3 is a graph showing the spectral response of the diffuse reflectivity, $R_d$, of a ZAP processed reflective holographic diffuser, imaged at 38° through a 25μ glass diffuser (i.e., glass diffusers having a surface dispersion of 25μ light-scattering particles), reconstructed with light from a tungsten point source at angles of incidence, $\theta_i$, of 45°, 30°, 20°, and 12°, and detected at normal incidence.
Figure 4:
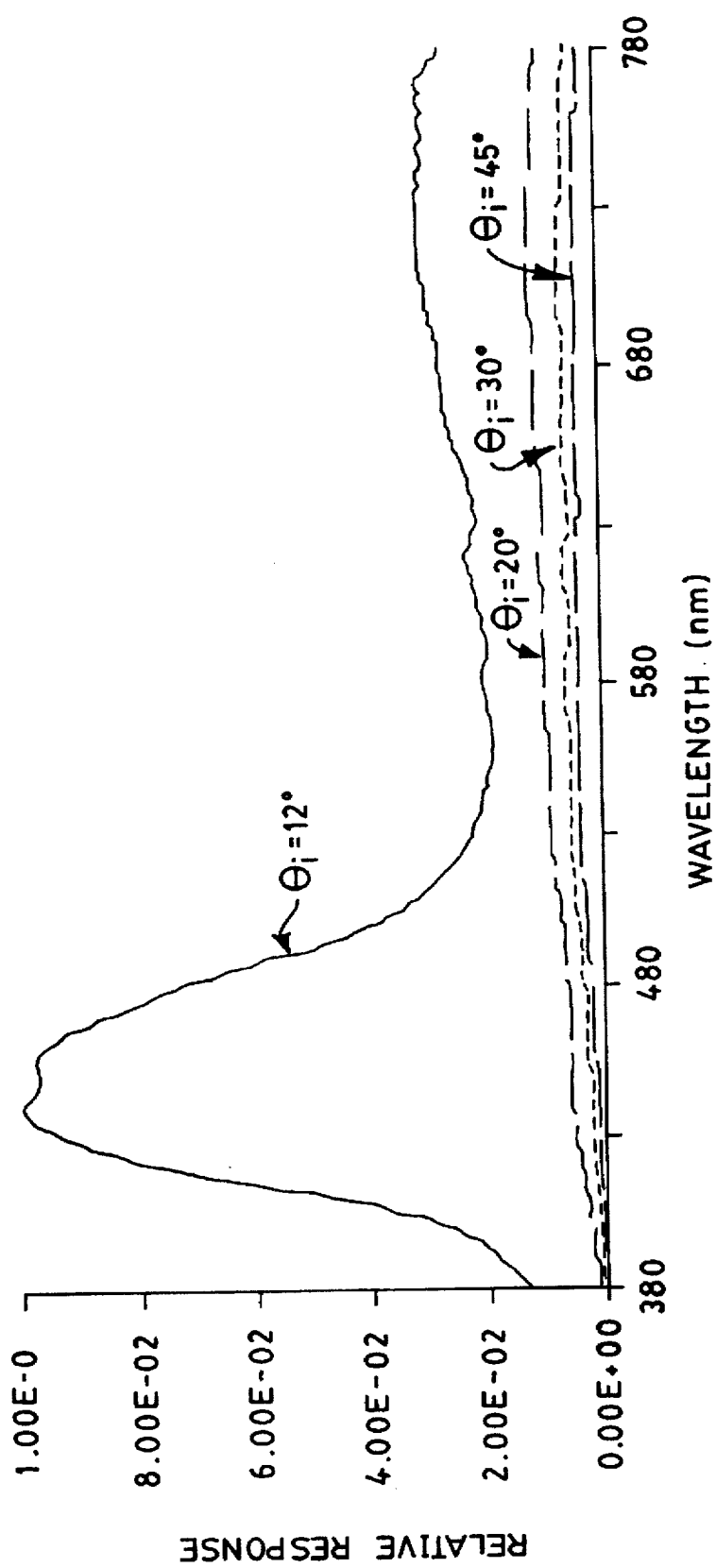
FIG. 4 is a graph showing the $R_d$ spectral response of a reflective holographic diffuser, imaged at 38° through a 25μ glass diffuser, processed with a 90:10 methanol/acetic acid solution followed with ZAP solution, reconstructed with light from a tungsten point source at angles of incidence, $\theta_i$, of 45°, 30°, 20°, and 12°, and detected at normal incidence.
Figure 5:
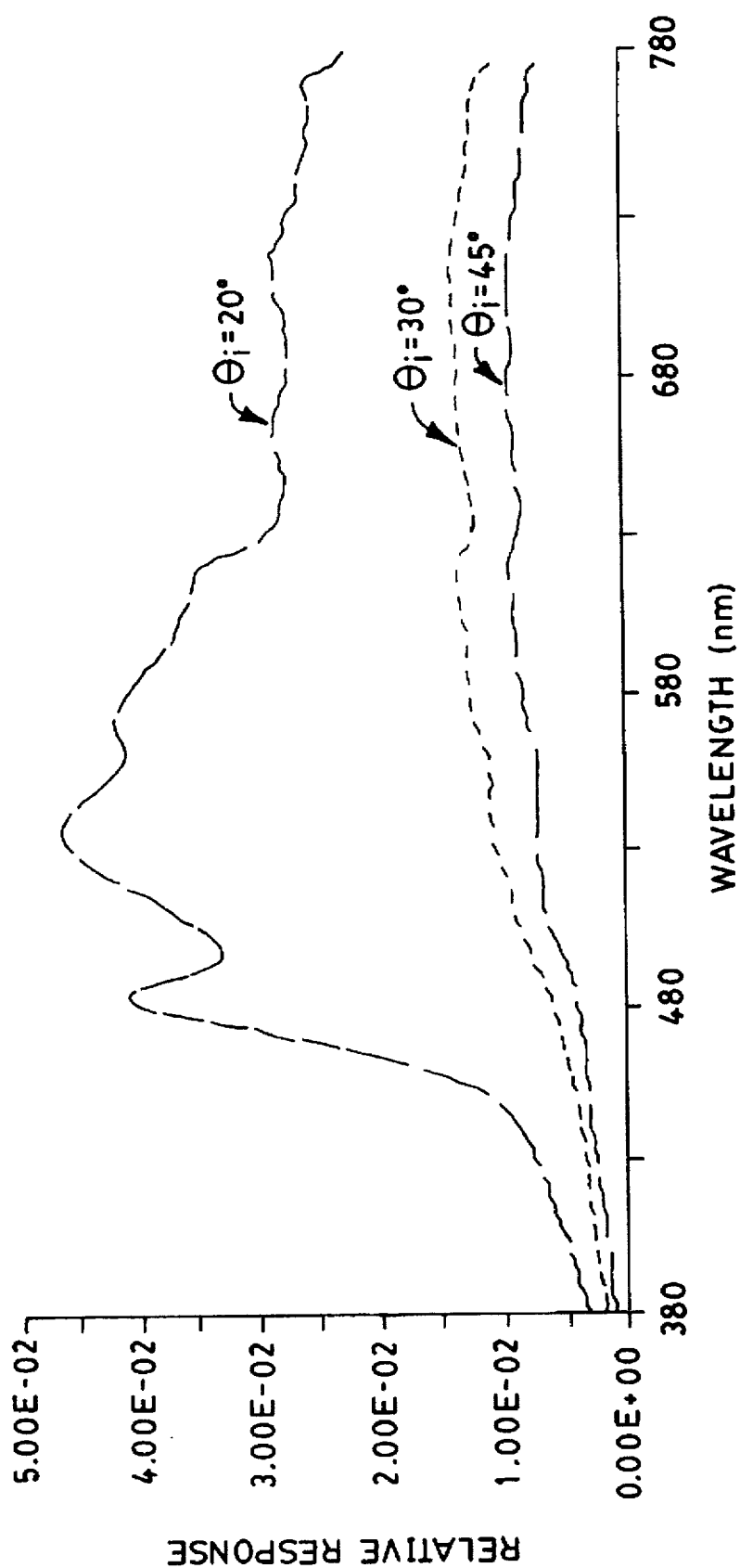
FIG. 5 is a graph showing the $R_d$ spectral response of a ZAP processed reflective holographic diffuser, imaged sequentially at 38° and 0° through a 25μ glass diffuser, reconstructed with light from a tungsten point source at angles of incidence, $\theta_i$, of 45°, 30°, and 20°, and detected at normal incidence.
Figure 6:
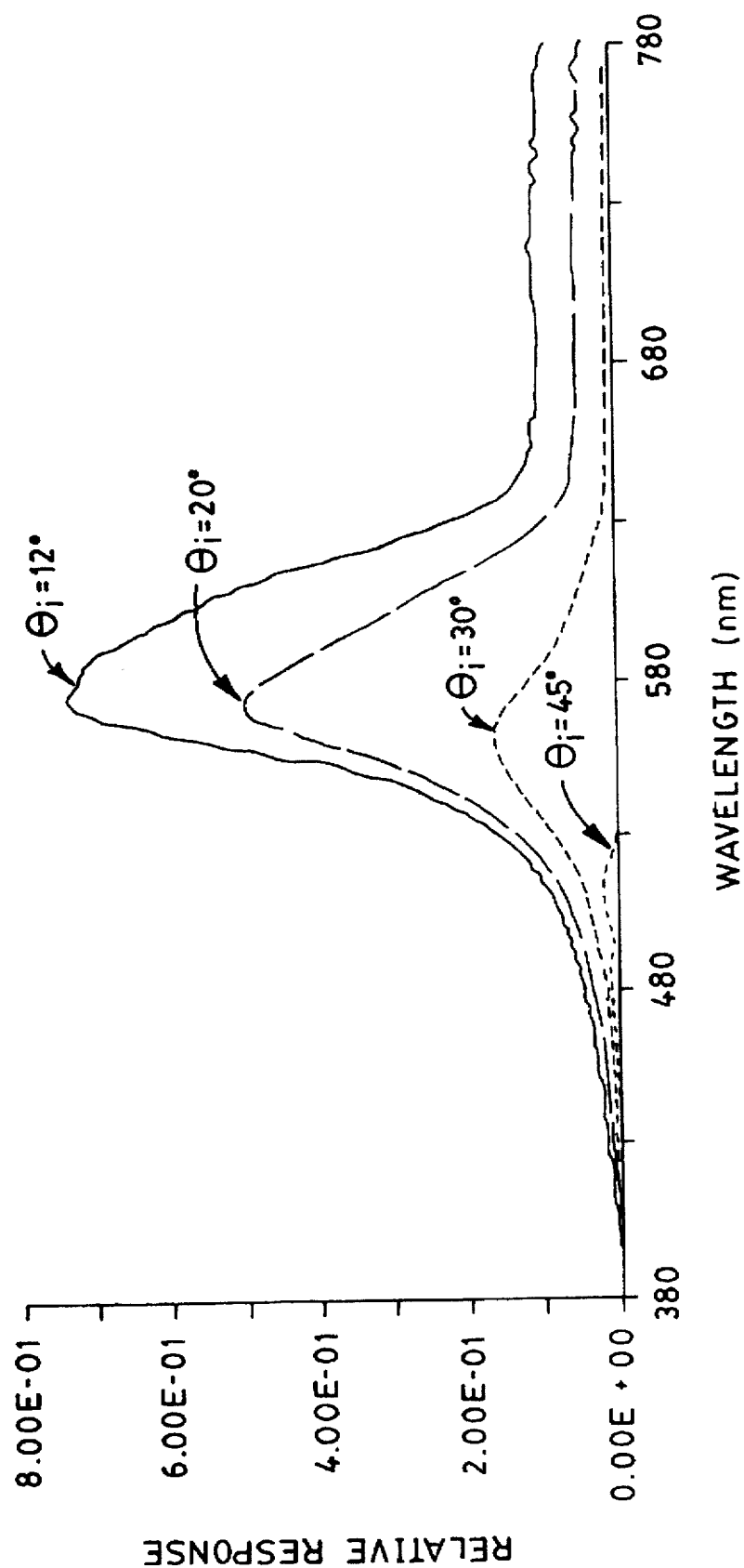
FIG. 6 is a graph showing the $R_d$ spectral response of a ZAP processed reflective holographic diffuser, imaged at 0° through a 5μ polymer diffuser, reconstructed with light from a tungsten point source at angles of incidence, $\theta_i$, of 45°, 30°, 20°, and 12°, and detected at normal incidence.
Figure 7:
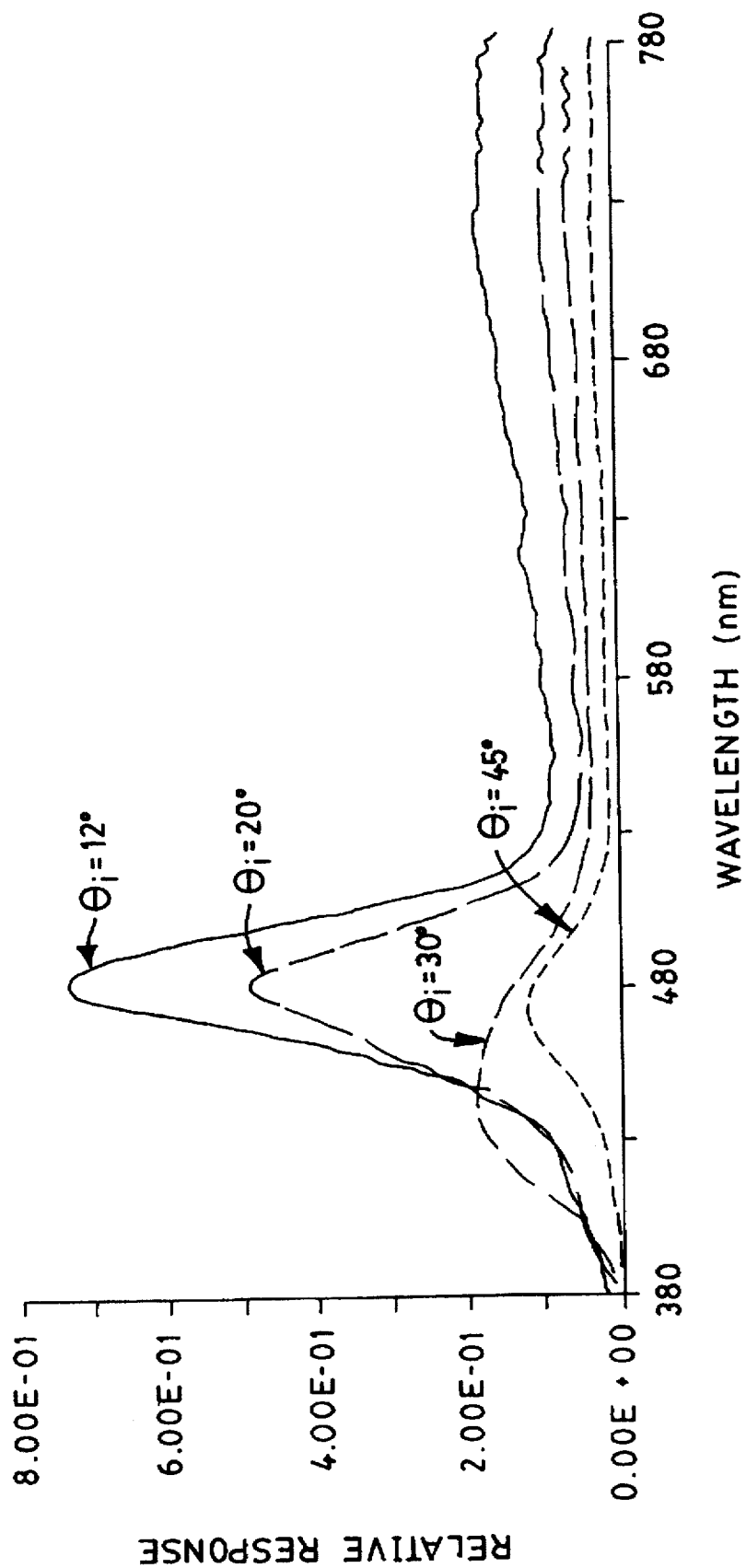
FIG. 7 is a graph showing the $R_d$ spectral response of a 90:10/ZAP processed reflective holographic diffuser, imaged at 0° through a 5μ polymer diffuser, reconstructed with light from a tungsten point source at angles of incidence, $\theta_i$, of 45°, 30°, 20°, and 12°, and detected at normal incidence.

In FIG. 2, the top spectrum, $S_I$, (continuous line) corresponds to a holographic diffuser according to the present invention, while the bottom spectra, $S_{PA'}$ and $S_{PA''}$, (discontinuous lines) correspond to holographic diffusers prepared in the conventional manner. Both the conventional and the inventive holographic diffusers were prepared using identical photopolymeric formulations (Polaroid DMP-128 film), coated at identical coverages, and exposed to identical levels of incident irradiance. The inventive diffuser, however, was exposed in a manner that resulted in the combination of two diffused wavefronts, whereas exposure of the conventional diffusers, in each instance, resulted in the combination of a diffused wavefront with an undiffused wavefront.

As evident in FIG. 2, the background level of diffuse reflectivity —which is a measure of brightness as a function of wavelength—is higher in the inventive holographic diffuser. Aside from the results of FIG. 2, it was further observed that any resolved peaks above the background, which arise as a result of greater irradiance levels at specific angles of incidence, were similar in magnitude. Such peaks correspond to increased brightness in the pertinent wavelength regions.

In the design of reflective holographic diffuser 10, light-transmissive substrate 12 can comprise any of a variety of sheet materials, although flexible polymeric sheet materials are preferred. Among preferred materials are polystyrene, polyethylene terephthalate, polyethylene, polypropylene, poly(vinyl chloride), polycarbonate, poly(vinylidene chloride), cellulose acetate, cellulose acetate butyrate, and copolymeric materials such as the copolymers of styrene, butadiene, and acrylonitrile, including poly(styrene-co-acrylonitrile). An especially preferred web material from the standpoints of durability, dimensional stability, and handling characteristics is polyethylene terephthalate. In a preferred embodiment, light-transmissive substrate 12 has a thickness of about 7 mil (0.178 mm).

Figure 14:
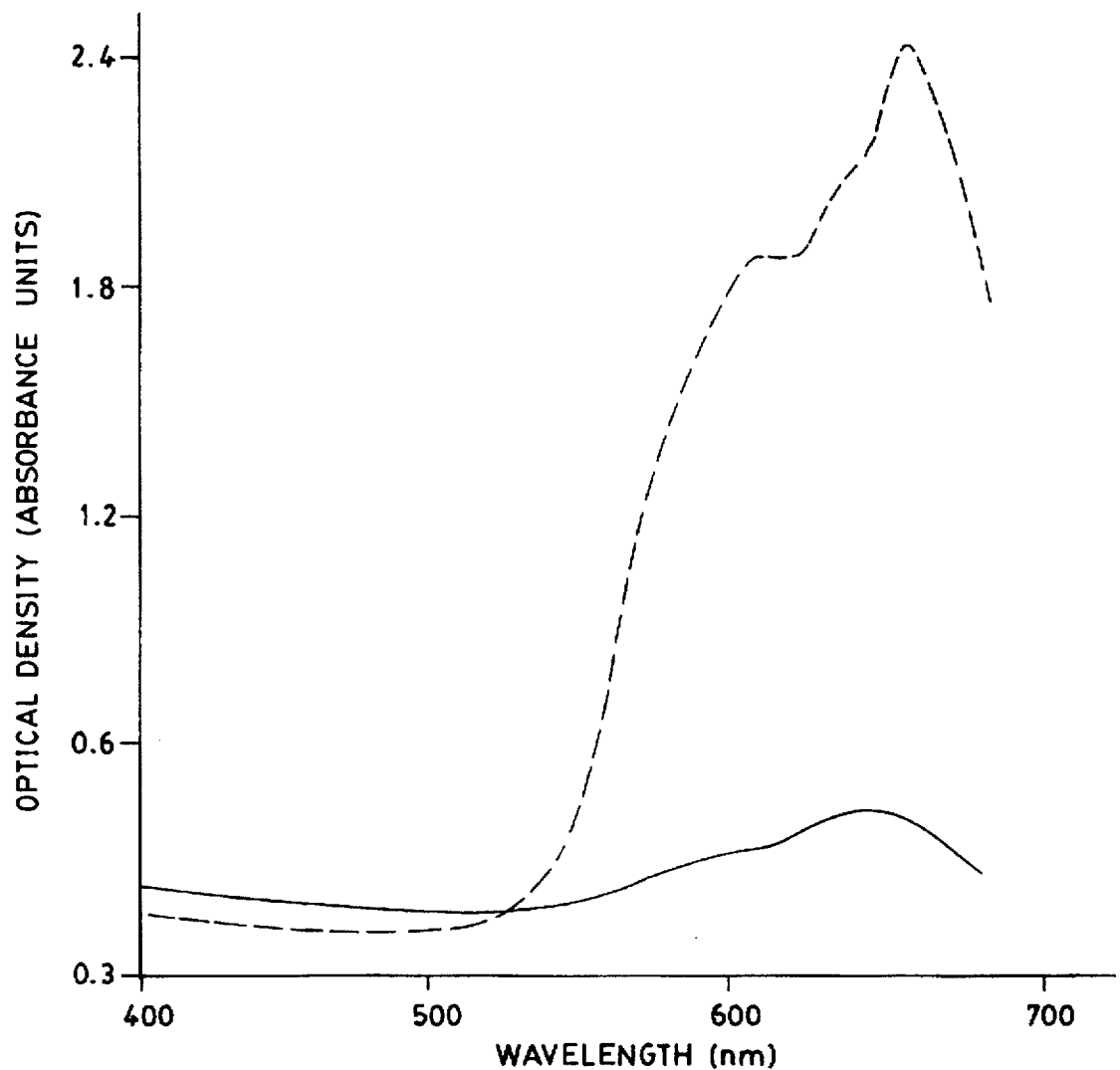
FIG. 14 is a graph showing optical density in absorbance units plotted against wavelength (nm) for a reflective holographic diffuser imaged at normal incidence with a writing power of 300 mW at a scan velocity of 0.15 cm/sec, where a 3μ glass diffuser precedes (exposure-wise) a dichromated gelatin-based holographic recording medium. The data is compared with that for a conventionally-prepared specular holographic mirror (dashed line)
Figure 15:
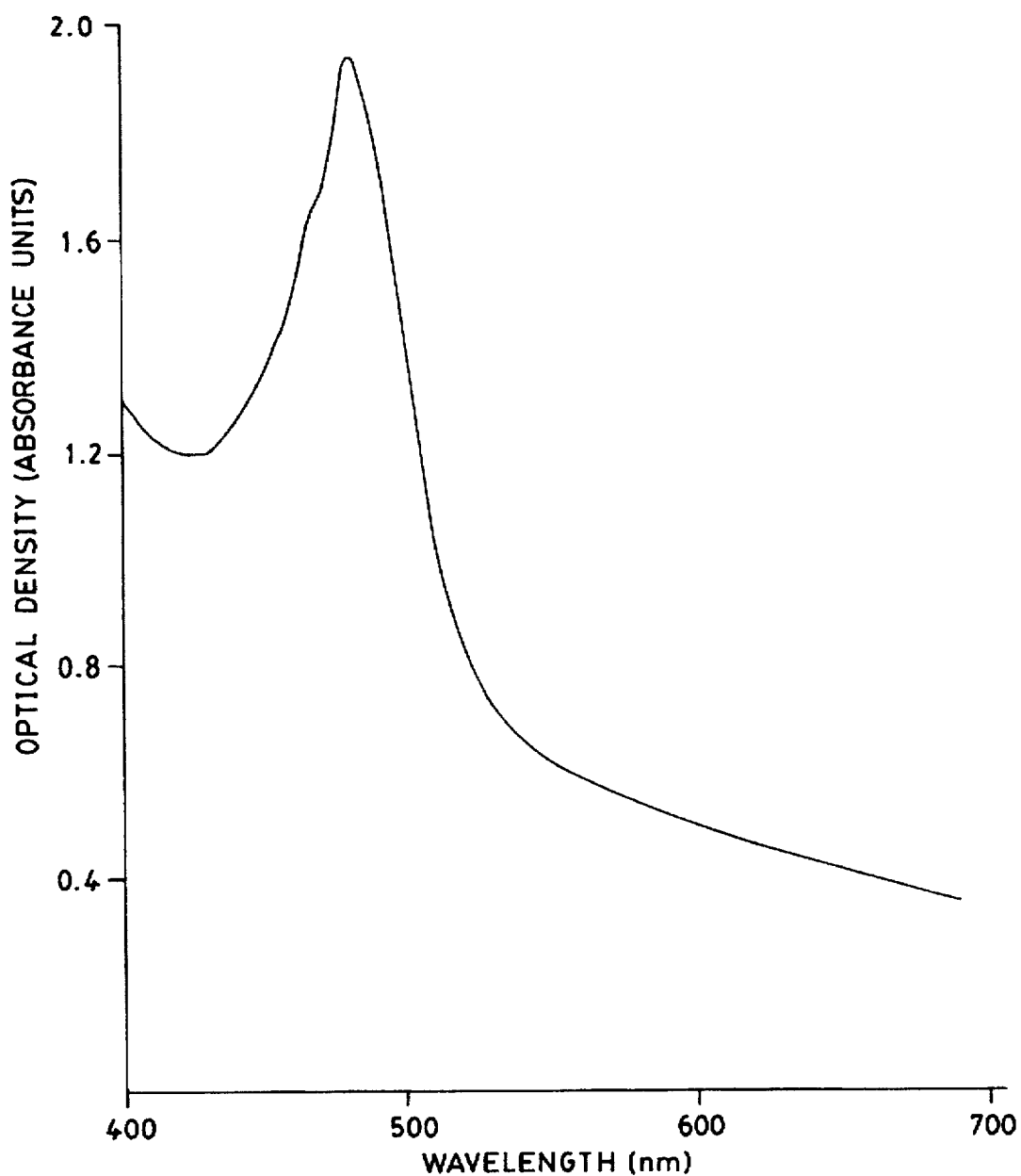
FIG. 15 shows optical density as a function of visible wavelength for a DMP-128 based holographic reflective diffuser imaged at normal incidence with a Kr laser (647 nm) at 50 mW, and processed in ZAP solution.
Figure 16:
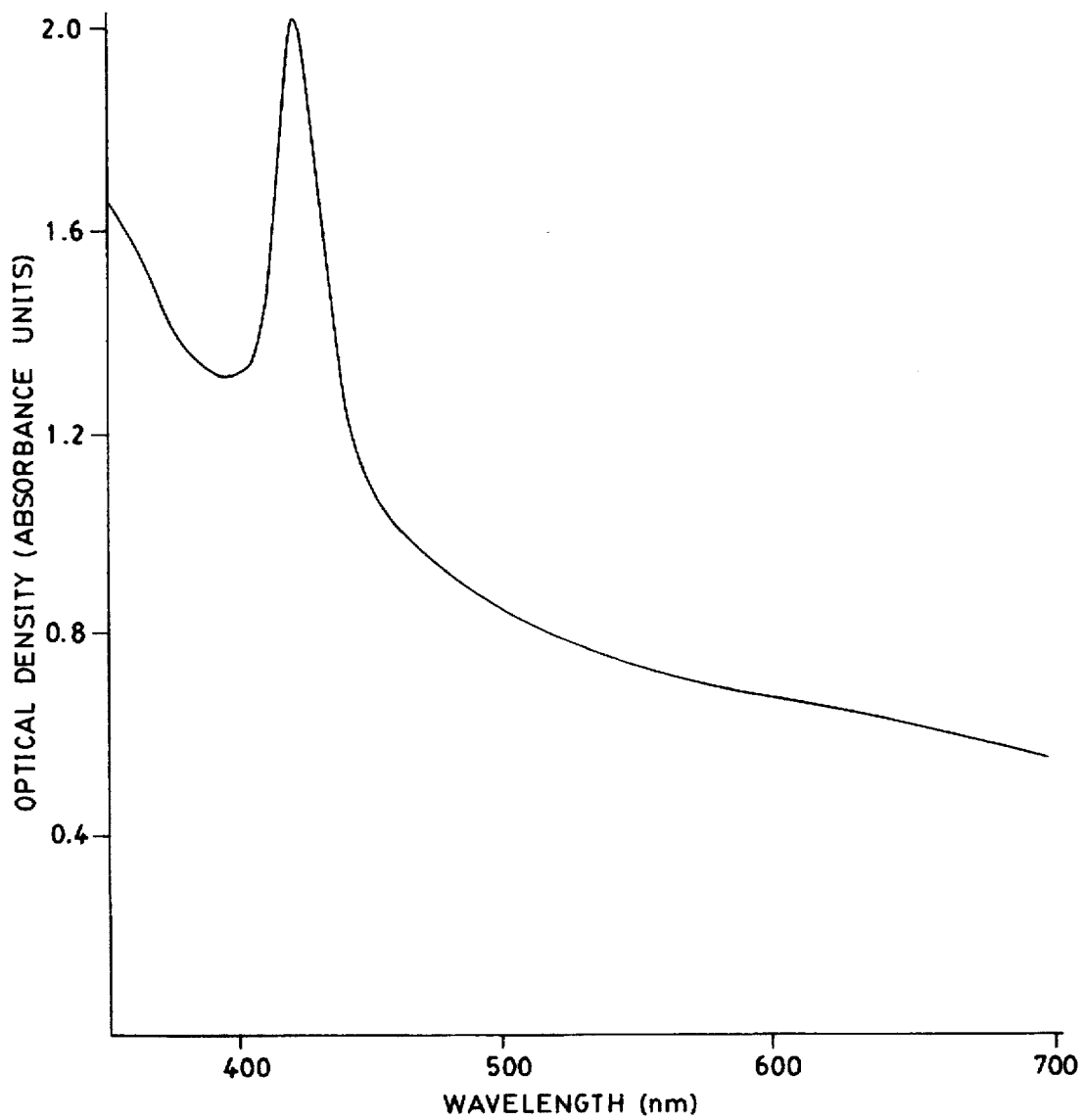
FIG. 16 shows optical density as a function of visible wavelength for a DMP-128 based holographic reflective diffuser imaged at normal incidence with a Kr ion laser (647 nm) at a writing power of 50 mW, and processed in 90:10/ZAP solution.

Recording media useful for the planar hologram layer 14 of the present invention can be made of a variety of materials. Among the more important are: silver halide emulsions, hardened dichromated gelatin, ferroelectric crystals, photopolymers (e.g., Polaroid DMP-128, vinylcarbazole polymers, etc.), photochromics, and photodichroics. Characteristics of these materials are given in *Volume Holography and Volume Gratings*, by L. Solymar and D. J. Cook, Chapter 10, Academic Press, New York, 1981, pages 254–304. Compositions desirably considered for use include DMP-128 (a proprietary photopolymer from Polaroid Corporation), dichromated gelatin (see FIG. 14, for empirical data relating to an embodiment of the present invention utilizing dichromated gelatin), silver-halide based compositions, and other compositions described in U.S. Pat. No. 4,588,664, issued to F. L. Fielding and R. T. Ingwall on May 13, 1986, and U.S. Pat. No. 4,696,876, issued to J. J. Cael on Sep. 29, 1987. Among these desirable compositions, Polaroid DMP-128—which comprises a dye sensitizer, a branched polyethylenimine, and a free radical polymerizable ethylenically unsaturated monomer—is preferred. Particular details of the composition may be found in the aforecited U.S. Pat. No. 4,588,664. See also, W. C. Hay and B. D. Guenther, "Characterization of Polaroid's DMP-128 Holographic Recording Medium", *Proceedings of the SPIE*, 883, pp. 102–105 (1988).

In another embodiment of the present invention, the high-efficiency reflective holographic diffuser 10 has a configuration comprising well-defined interference fringe planes that exhibit significant angular deviation from the surface plane of the planar hologram layer 14. These so-called "slanted fringe plane" diffusers are generally useful for applications requiring diffusion characteristics having an operative viewing angle different from the specular angle of the incident angle of a reconstruction beam. These diffusers are made as described above, however, the diffused counterpropagating wavefront used in the production of the diffuser holographic interference pattern is produced by reflecting the diffused incident wavefront back through the planar hologram layer 14 with a reflector 30 having non-specular reflectivity. Such reflectors could be holographic reflectors or a reflector having a non-planar topography. With regard to the later, several topographic surfaces for the reflector 30 are contemplated including, but not limited to, lenticular surfaces, wavy surfaces, and grooved surfaces having "sawtooth", wedge-like, or V-shaped grooves. The "sawtooth", grooved topography of so-called blazed reflection gratings are particularly useful and desirable.

With regard specifically to the use of blazed reflection gratings ruled in metal surfaces, it is noted that light incident normal to the surface of the ruled grating is reflected in a manner described by the equation $d \cdot \sin\theta = m\lambda$, where d is the grating period, $\theta$ is the diffraction angle measured from the surface normal, $\lambda$ is the wavelength, and m represents the order number of the diffraction observed. Interaction between the incident wavefront and the angularly reflected counterpropagating wavefront produces interference fringe planes in which the slant angle $\phi = \frac{1}{2}\theta$. A resultant reflective holographic diffuser can be reconstructed with the conjugate of the counterpropagating wavefront to produce the conjugate of the incident wavefront.

In general, regardless of its embodiment, the high-efficiency holographic diffuser 10 is preferably formed by diffusing a coherent wavefront prior to its incidence on a holographic recording medium, transmitting the diffused wavefront through the holographic recording medium, then reflecting the transmitted diffused wavefront back through the holographic recording medium (e.g., with a highly reflective optical element).

More particularly, the method for making a holographic diffuser 10 commences with the provision of a holographic recording medium. A suitable recording medium typically comprises a photoactivatable composition deposited on a light-transmissive substrate 12. The light-transmissive substrate 12 is as described above. The photoactivatable composition is one capable of being activated by (and having a response to) actinic coherent radiation such that the medium is capable of recording holograms.

Provided with a suitable holographic recording medium, the medium is then exposed to wavefronts of coherent radiation to produce a hologram. In accordance with the present invention, the wavefronts of coherent radiation comprise a diffused incident wavefront and a diffused counterpropagating wavefront substantially coherent with said incident wavefront. And, in accordance with the production of reflective holograms, the diffused incident coherent wavefront impinges upon the recording medium from a first side, whereas the diffused counterpropagating coherent wavefront impinges the medium from a side opposite the first. During exposure, the wavefronts of diffused coherent radiation merge in the recording medium, activate the photoactivatable composition (spatially, according to the resultant constructive interference pattern), and thereby effect therein the production of a latent interference pattern (cf., a latent phase grating).

An appropriate exposure time is readily determined by routine testing, as is well known in the art, and will vary according to the intensity of the exposing radiation, the relative distances between the holographic recording medium, a source diffuser 20, and a reflector 30, and like factors. These and other factors can be varied as necessary to change the exposure duration, either shorter or longer, as desired to obtain the preferred combination of exposure duration and light intensity for a given recordation. Further, exposure can be accomplished with either sequential or simultaneous imaging at multiple incident angles to provide a reflective holographic diffuser which, for example, effectively diffracts light over the entire visible wavelength region. See e.g., U.S. Pat. No. 5,046,793, issued to Hockley et al. on Sep. 10, 1991. Likewise, both on-axis (i.e., at normal incidence, see exposure 1B in FIG. 1) and off-axis exposure (i.e., at oblique incidence, see exposure 1A in FIG. 1) geometries may be implemented; in either case, the volume reflection hologram will be produced having holographically recorded therein the desired optical properties of the light diffusing object.

Figure 20:
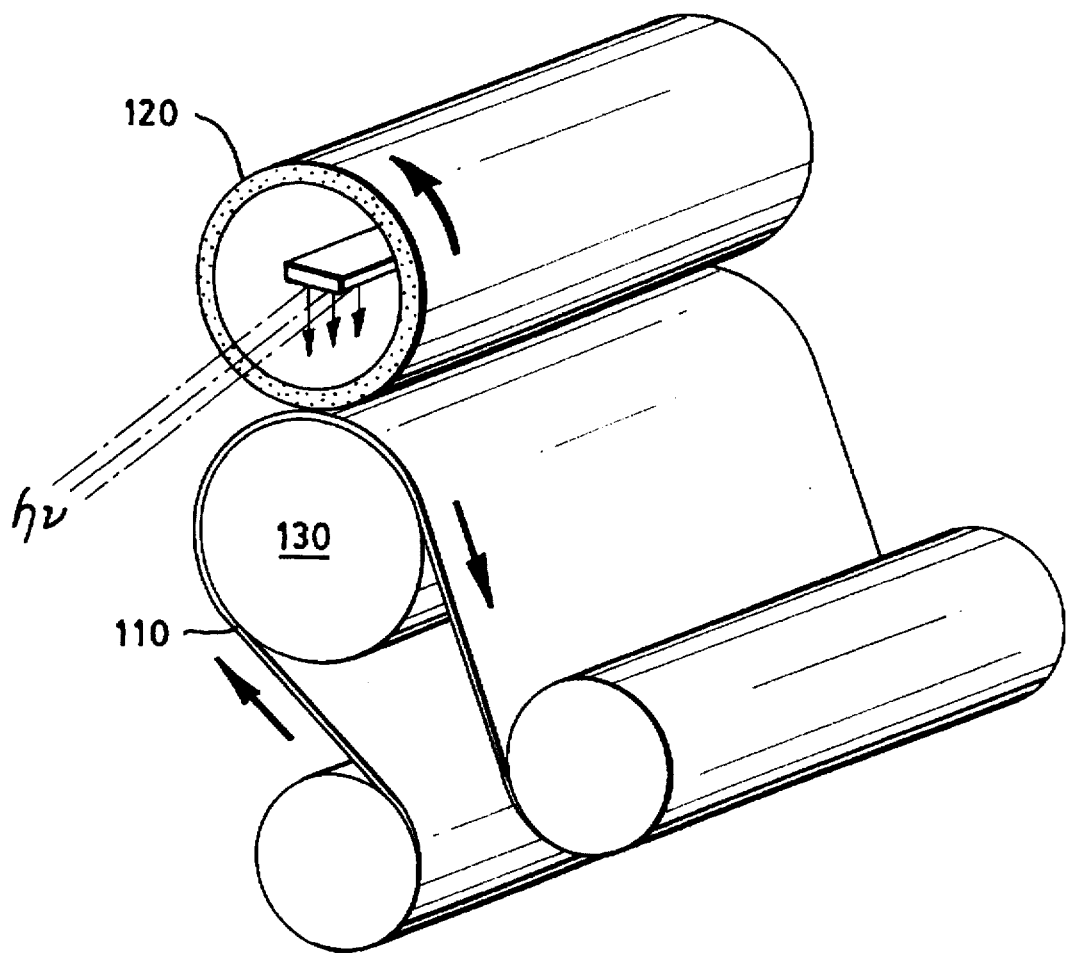
FIG. 20 schematically represents a machine that can be used in practicing the inventive methodology described herein.

One preferred exposure operation is effected by sequentially scanning a holographic recording medium 10 (for example, in direction d in FIG. 1 ) with a strip of diffused incident coherent light (for example, exposure strips 1a and/or 1b). Sequential scanning can be accomplished by oscillating a beam of coherent laser light—i.e., a so-called "flying spot"—along a first axis to expose a region (cf., a "strip", "bar", "line", etc.) of said recording medium, then displacing sequentially the oscillating beam along a second axis normal to the first axis. An oscillating beam can be produced by utilizing a galvonometric oscillating mirror. In addition to effecting exposures of comparatively high intensity, sequential scanning exposures are well-suited for mass production of holographic diffusers on a continuous web, and is accordingly desirable. A machine 100 comprising a reflective drum 130 bearing said continuous web 110 and abutting a light-diffusing transmissive drum 120 can be used to accomplish such a task. See FIG. 20.

Another particularly preferred exposure operation is effected by transmitting a coherent wavefront through a lens prior to transmission through the source diffuser 20, such that the incident coherent wavefront is non-planar and impinges source diffuser 20 at multiple angles of incidence simultaneously, such that the diffused incident coherent wavefront impinges holographic recording medium 10 with an altered angular profile.

Sources for the diffused coherent wavefronts are several. Typically, however, diffused coherent wavefronts are produced by directing a beam, fan, or biaxially expanded flood of coherent light (i.e., from a laser) through, for example, a conventional light-transmissive diffuser or a conventional transmission hologram diffuser. Examples of suitable conventional light-transmissive diffusers would include ground glass, frosted glass, or an otherwise clear plastic or glass sheet incorporating therein a uniform dispersion of light scattering domains. Regarding the latter, the concentration and size of the light scattering domains can be varied to tailor or provide certain optical attributes in the reflective holographic diffuser 10, e.g., angular dependence of diffuse reflectivity.

By placement of source diffusers 20 in the beam path preceding holographic recording medium 10, transmission of coherent laser light through the source diffuser 20 toward the layer of photoactivatable composition 10 will effect a diffused incident coherent wavefront. The wavefront that emerges from the layer of photoactivatable composition 10 can then be reflected back toward and through said layer, thereby producing an interference pattern. As a suitable reflector 30, a mirror will typically be employed, or—in the case of a reflective holographic diffuser with slanted fringe planes—an angular reflector, such as one with a topographically non-uniform reflective surface. In either case, good results are obtained where the reflector 30 is highly reflective and is placed immediately proximate to the layer of photoactivatable composition 10, on the side opposite said source diffuser 20.

In instances where reflector 30 and/or source diffuser 20 are immediately proximate to the recording medium 10, an air interface will typically be present between the recording medium 10 and the abutting element. To prevent distortion of the intended angular direction of the propagating wavefronts by unintended refraction at said interface, the interface can be removed by the evacuation of air therein (thereby, providing optical contact), or by employing a suitable index matching medium to "fill" said interface (thereby, optically coupling the recording medium 10 and the abutting element). The use of index matching fluid is preferred when an abutting reflector has a non-planar topography. Index matching fluids (such as xylene) and the use thereof is well known in the art.

To complete the reflective holographic diffuser 10, the exposed recording medium is subsequently processed to develop the recorded latent interference pattern. In a particular mode of practice, the recording medium is developed, for example, to intensify the imaged element (such as by treatment with chemical processing baths in the case of DMP-128), or to "fix" (or otherwise make more stable) the photopolymeric reaction products (cf., fringe structures) actinically generated by the irradiation. Certain details concerning the use and processing of photopolymerizable compositions used for holographic recordings can be found, for example, in U.S. Pat. No. 4,588,664, issued to H. L. Fielding and R. T. Ingwall on May 13, 1986; U.S. Pat. No. 4,696,876, issued to J. J. Cael on Sep. 27, 1987, and U.S. Pat. No. 5,198,912, issued to R. T. Ingwall, M. A. Troll, and D. H. Whitney on Mar. 30, 1993. Those skilled in the art will know of the various methods for processing the various types of recording media that may be used in the present invention. It will be appreciated that subsequent processing will depend on the nature of the selected recording medium. Accordingly, construction of the term "development" will compel consideration of the processes desired and/or required to finalize, or otherwise prepare for use, a particular imaged recording medium. It will be appreciated that in the formation of a volume phase hologram in Polaroid DMP-128, a subsequent non-imagewise or flood exposure to incoherent light is normally performed to polymerize unexposed monomer and to "fix" the extant spatial relationships of the monomer gradient in the photopolymerizable layer.

Although the exposure of the recording medium to matching diffused wavefronts is central to the practice of the present invention, the exposure can be controlled along several parameters to design a reflective holographic diffuser having distinctive and/or unique optical properties. Other or like variations can also be accomplished by controlling certain parameters in the subsequent development step, or by modifying the configuration of the holographic recording medium. For example, the solid angle of viewing and the reconstruction color of the reflection hologram diffuser can be controlled by: (1) the incident angle used for imaging, (2) the type of post-exposure chemical processing, and (3) utilization of an additional diffracting element as the source diffuser. Similarly, as demonstrated in several of the Examples provided below, the wavelengths of peak efficiency (i.e., the wavelengths at which the holographic diffusers exhibit the highest efficiency), as well as the wavelength deviation of said peak, can be specifically designed by controlling such parameters as initial angle of irradiance and post-exposure chemical processing. FIGS. 3 to 19 (samples were imaged with a Kr ion laser at a 647 nm output) and the brief descriptions thereof are included to provide insight into the control of several process parameters and the resultant optical properties effected thereby. Reference can also be made to the Examples, infra.

As mentioned above, a holographic reflective diffuser according to the present invention can be used in an image-providing display to provide significantly increased brightness under normal room light conditions. Suitable image-providing display elements are those capable of providing an image viewable by the transmission of light therethrough. Examples of said image include, but are not limited to, images provided by addressable electrooptical devices, such as liquid crystal elements and electrophoretic display elements; and static light-transmissive elements, such as binary images provided on a light-transmissive substrate and photographic slides.

With regard to embodiments involving static light-transmissive images, by way of illustration, a reflective holographic diffuser can be applied onto, for example, an initially light-transmissive display in the nature of a "sign" (or "billboard"), thus converting said sign to a reflectively-viewable sign. A resultant sign can be made to utilize ambient light to give the effect of an electrically backlit sign. In such embodiment, the sign may utilize an "off-axis" diffuser which would take incident overhead light and reflect it horizontally toward a predetermined viewing location. Similar use of the reflective holographic diffuser as a light manipulating backing can be accomplished with photographic slides or other like image transparencies.

With regard to embodiments involving addressable electrooptical devices, it is contemplated that the inventive reflective holographic diffusers can be employed in the manufacture of a non-backlit, reflectively viewable liquid crystal display. Such a liquid crystal display can comprise a liquid crystal display element and the reflective holographic diffuser 10. An envisioned liquid crystal display element comprises a liquid crystal cell, a plurality of selectively actuatable electrode segments, and first and second polarizers of front and rear sides of the cell. A desirable configuration for a non-backlit, reflectively viewable liquid crystal display is described in the aforecited International Patent Application No. PCT/US 94/11818 of A. G. Chen et al., published May 11, 1995, as International Publication No. WO 95/12826.

In the design of a holographic reflective diffuser 10 for use in an image-providing display, it will be appreciated that the performance of the display for viewing by an observer is dependent upon the brightness and resolution of the image as perceived by a person in a particular position. In displays employing conventional reflectors, oftentimes the brightness of the image in a particular portion of the screen varies with the viewer's position. The screen is not at the same brightness over the whole area, and the distribution of light on the screen makes it difficult for the viewer to observe all parts of the viewing screen and extract information therefrom with reliability. Accordingly, to gain advantage from the optical design flexibility provided by the present holographic manufacturing processes, in the design of holographic reflective diffuser 10, it is desirable to define an output cone ("zone", or "pupil") through which the majority of the light from the display screen is propagated. When light can be propagated toward such defined output cone, with little scattering elsewhere, then brightness is controlled and enhanced ("gain") because less light is "wasted" by scattering to non-viewed volumes.

While it is one useful application of the present invention to provide liquid crystal display embodiments incorporating a reflective holographic diffuser 10 capable of producing (by reflection) an output cone of diffused light having gain within predetermined angular ranges, it will be appreciated that the full scope of the present invention—aside from its high diffractive efficiency—is not limited to any particular predetermined optical characteristic of the holographic diffuser 10. Holographic diffusers having any variety of light diffusing functionality are envisioned depending on the requirements of particular applications. As evident from the literature, species of holographic diffusers are several and various. See e.g., S. Wadle, et al., *Holographic Diffusers*, OPTICAL ENGINEERING, Vol. 33, No. 1, p.213 et seq. (January 1994); D. Meyerhofer, *Holographic and Interferometric Viewing Screens*, APPLIED OPTICS, Vol. 12, No. 9, p.2180 et seq. (September 1973); J. M. Tedesco, et al., *Holographic Diffusers for LCD Backlights and Projection Screens*, SID 93 DIGEST, Ch. 5.3, p.29 et seq. (1993). See also, U.S. Pat. No. 5,365,354 (Jannson et al.) and U.S. Pat. No. 5,046,793 (Hockley et al.). The teachings found in these and other like references may be incorporated into embodiments of the present invention by those skilled in the art in view of the teachings disclosed herein.

The following Examples are now provided, though by way of illustration only, to show details of particularly preferred known reagents, conditions, and techniques used in the process of the present invention. All parts, ratios, and proportions, except where otherwise indicated, are by weight.

EXAMPLES

Preparation of Reflective Holographic Diffuser

Holographic recording media were provided as follows: a premix aqueous solution of polyethylenimine was prepared comprising Corcat P600XL branched polyethylenimine (approx. mol. wt. 40–60 K), 2-propanol, and p-methoxyphenol in water. The premix solution was combined with an aqueous solution of poly-N-vinyl pyrrolidone (30% solids; e.g., Plasdone c-15 from GAF, Inc.), a solution of methylene bisacrylamide in 2-propanol and water, an aqueous methylene blue solution, acrylic acid containing a small amount of p-methoxyphenol polymerization inhibitor, lithium acrylate and water to give a coating solution having the following composition:

| Component | Amount |
|---|---|
| Acrylic Acid | 0.099 g |
| Lithium Acrylate | 1.250 g |
| Water | 0.900 g |
| Poly-N-vinyl pyrrolidone (30% solids) | 1.875 g |
| Methylene Blue Solution (6.40 g methylene blue in water to make 1000 ml.) | 0.684 g |
| Methylene bisacrylamide solution (0.040 g methylene bisacrylamide, 0.400 g 2-propanol, and .560 g water) | 0.245 g |
| Corcat P-600 solution (4.26 g water, 0.943 g Corcat P-600 branched polyethylenemine, 0.0078 g p-methoxy phenol, and 0.039 g 2-propanol) | 1.875 g |

The coating mix was drawn onto a glass substrate to give a dry thickness of about 10 microns.

Recording media prepared as such were humidified, then holographically imaged. Particular details of imaging are set forth in the Examples, below. In general, however, imaging (i.e., exposure) was carried out with a krypton ion laser (from Coherent Laser, Inc.) at an emission of 647 nm. The incident angle of the incident coherent wavefront was adjusted with a mirror mounted to a rotation stage with a rotational control of ±1.0° about the axis parallel to the surface of the optical table. The assembly was affixed to a unidirectional scanning table (Accudex from Aerotech, Inc.), operated at a scanning speed between 0.1667 and 0.3333 cm/sec. Scanning was effected by a Unidex 1 Motion Controller, also from Aerotech, Inc. A scanning galvanometer with amplitude and offset controlled by a CX-660 Scanner Control from General Scanning, Inc. was used to provide a "flying" laser spot for imaging, such that the resultant bar area (see FIG. 1) was 3.0 cm$^2$.

After imaging, certain exposed slides (identified in the examples below) were fixed by flood exposure, then chemically processed for about two minutes in an alcoholic solution of 5% zirconium acetate (i.e., "ZAP"), or chemically processed first in a 90:10 methanol/acetic acid solution for 2 minutes, then in ZAP solution for 2 minutes. All samples were rinsed with a 3:1 solution of propanol/methanol which was squeeze applied.

Measurement of Experimental Results

In the results reported below, unless otherwise specified, reflectivity was quantified by assessing visible spectra obtained on a LAMBDA 9 UV-VIS spectrophotometer (available from Perkin-Elmer). Samples were positioned at the focus of the sample beam. Neutral density filters were used to modulate the intensity of the reference beam. Unless otherwise indicated, diffuse reflection, $R_d$, was quantified by recording the spectral radiance using a Photo Research SpectraScan PR704 Spectraradiometer through a collection aperture which resulted in a 0.25° solid angle of detection. Samples were oriented with their front surface at 90° to the camera lens. Illumination was carried out with a tungsten point source positioned so that the polar angles of incidence were approximately between 45° and 10° from the axis of the sample plane. All of the reflective holographic diffusers exhibited Bragg diffraction peaks corresponding with and indicative of the dependency of viewed brightness upon illumination and viewing angles and wavelengths.

Example 1

In the manner described in the Preparation above, a holographic recording medium was prepared, imaged at normal incidence (i.e., $\theta_i=0°$) with Kr ion laser radiation passed through a 25 micron ground glass surface, then chemically processed in ZAP solution.

The spectrum of the resultant reflective holographic diffuser (see FIG. 15) exhibited a rising contribution from background scattering as a function of decreasing wavelength and a Bragg diffraction peak above the background with $\lambda_{max}$ at 484 nm. Optical Density (OD) due to the background scattering contribution was measured to be 0.35, 0.5, 0.84, and 1.3 at 700, 600, 500, and 400 nm, respectively. The peak efficiency ($\lambda_{max}$) at 484 nm had an OD of 1.94 and a $\Delta\lambda_{1/2}$ (i.e., full-width at half-height) of 40 nm.

Example 2

A reflective holographic diffuser was prepared according to the methodology of Example 1. However, following imaging, the exposed medium was chemicaly processed first in a 90:10 methanol/acetic acid solution, and then in the ZAP solution.

The spectrum of the resultant holographic diffuser (see FIG. 16), like Example 1, exhibited a rising contribution from background scattering as a function of decreasing wavelength, but the diffraction peak above the background was "blue-shifted" to a shorter wavelength. The OD due to the background was measured to be higher at longer wavelengths, i.e., 0.56, 0.68, 0.86, and 1.29 at 700, 600, 500, and 400 nm, respectively. The peak efficiency ($\lambda_{max}$) at 422 nm had an OD of 2.04 and a $\Delta\lambda_{1/2}$ of 20 nm.

Example 3

Figure 17:
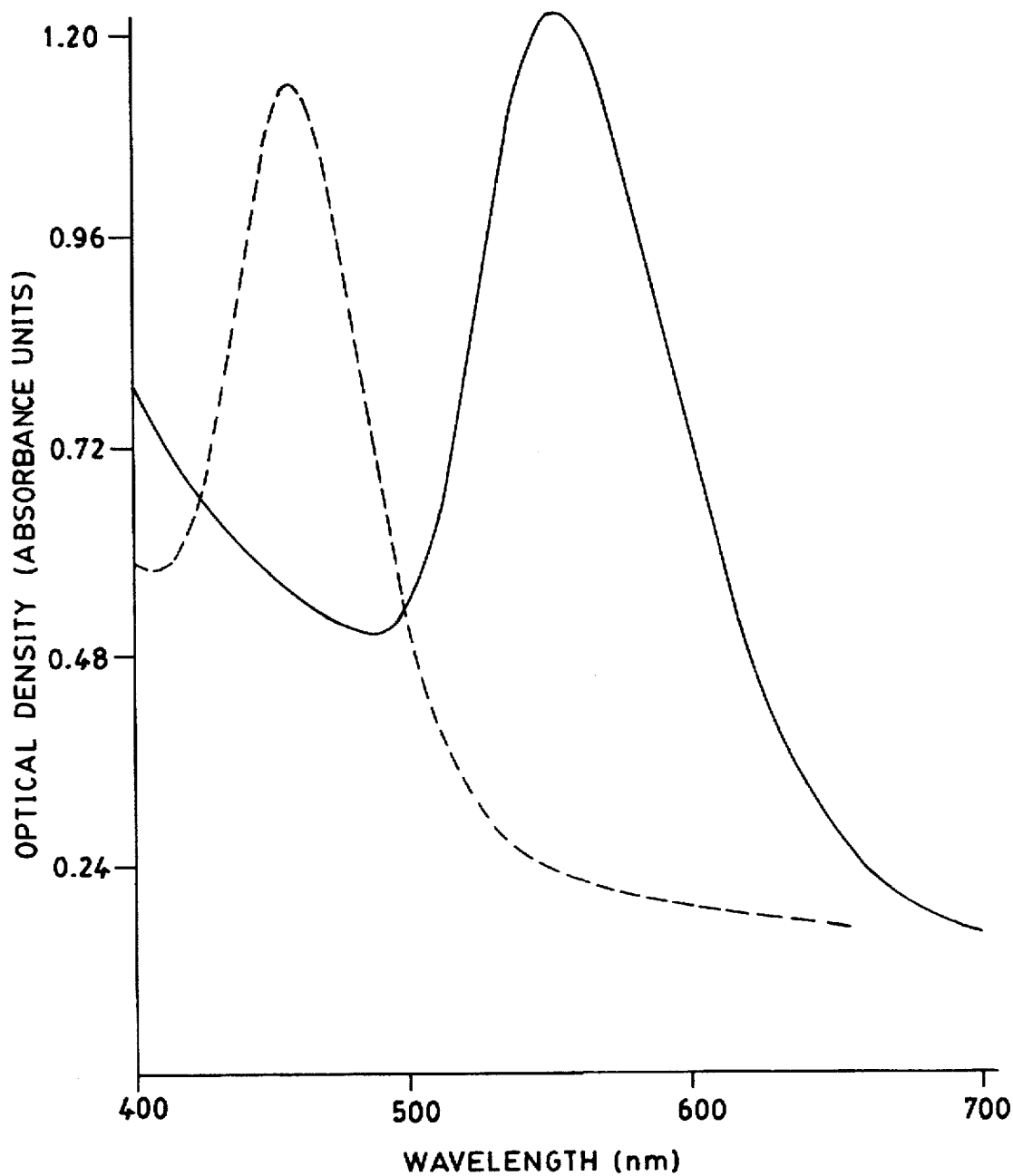
FIG. 17 shows optical density as a function of visible wavelength for a DMP-128 based holographic reflective diffuser imaged at an incident angle of 38° with a Kr ion laser (647 nm) at a writing power of 150 mW, and either processed in 90:10/ZAP solution (dashed line) or ZAP solution only (solid line)
Figure 18:
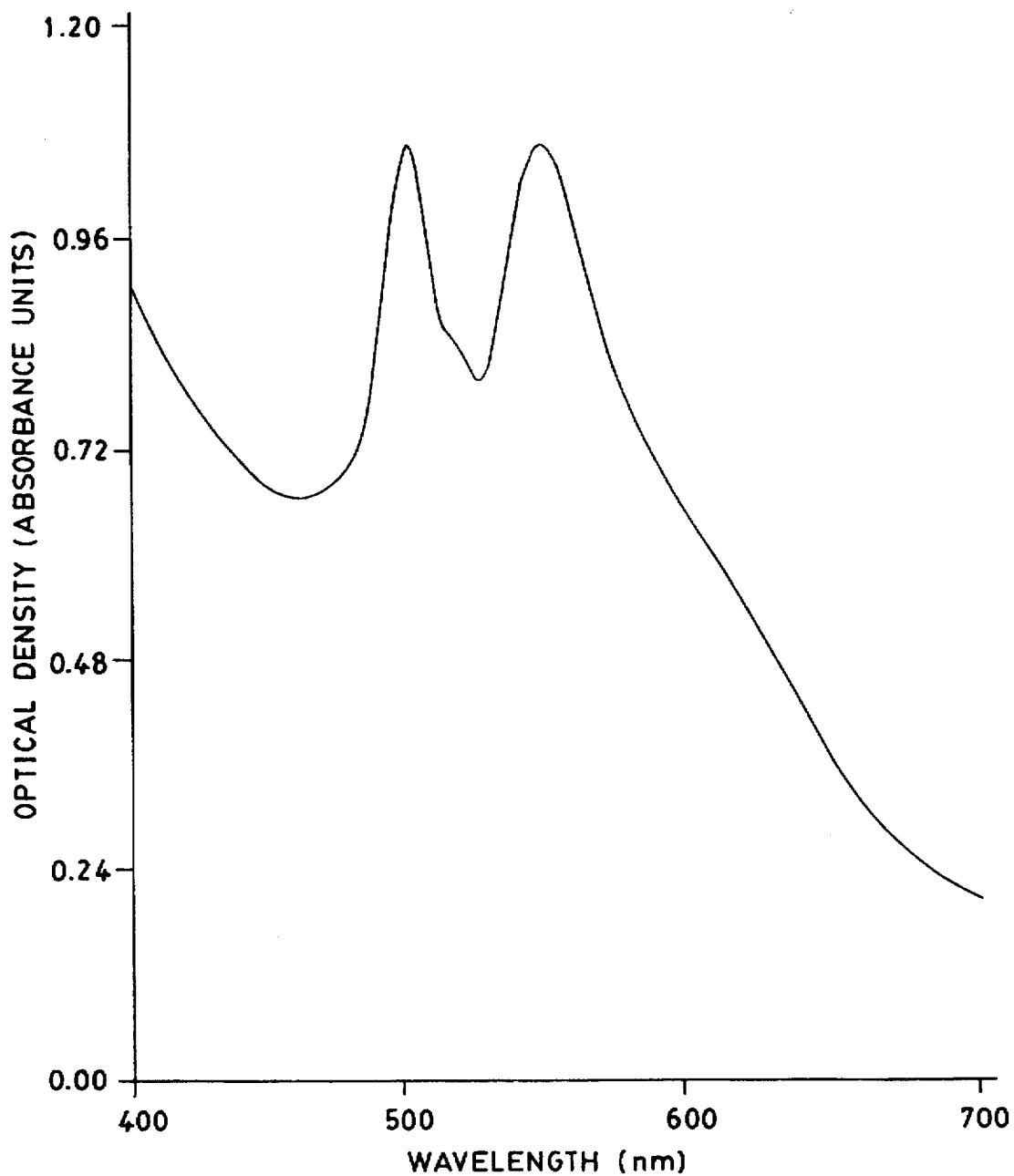
FIG. 18 shows optical density as a function of visible wavelength for a DMP-128 based holographic reflective diffuser imaged first at an incident angle of 38° with a Kr ion laser (647 nm) at a writing power of 50 mW, then at an incident angle of 0° with a Kr ion laser (647 nm) at a writing power of 150 mW, and then processed in ZAP solution.
Figure 19:
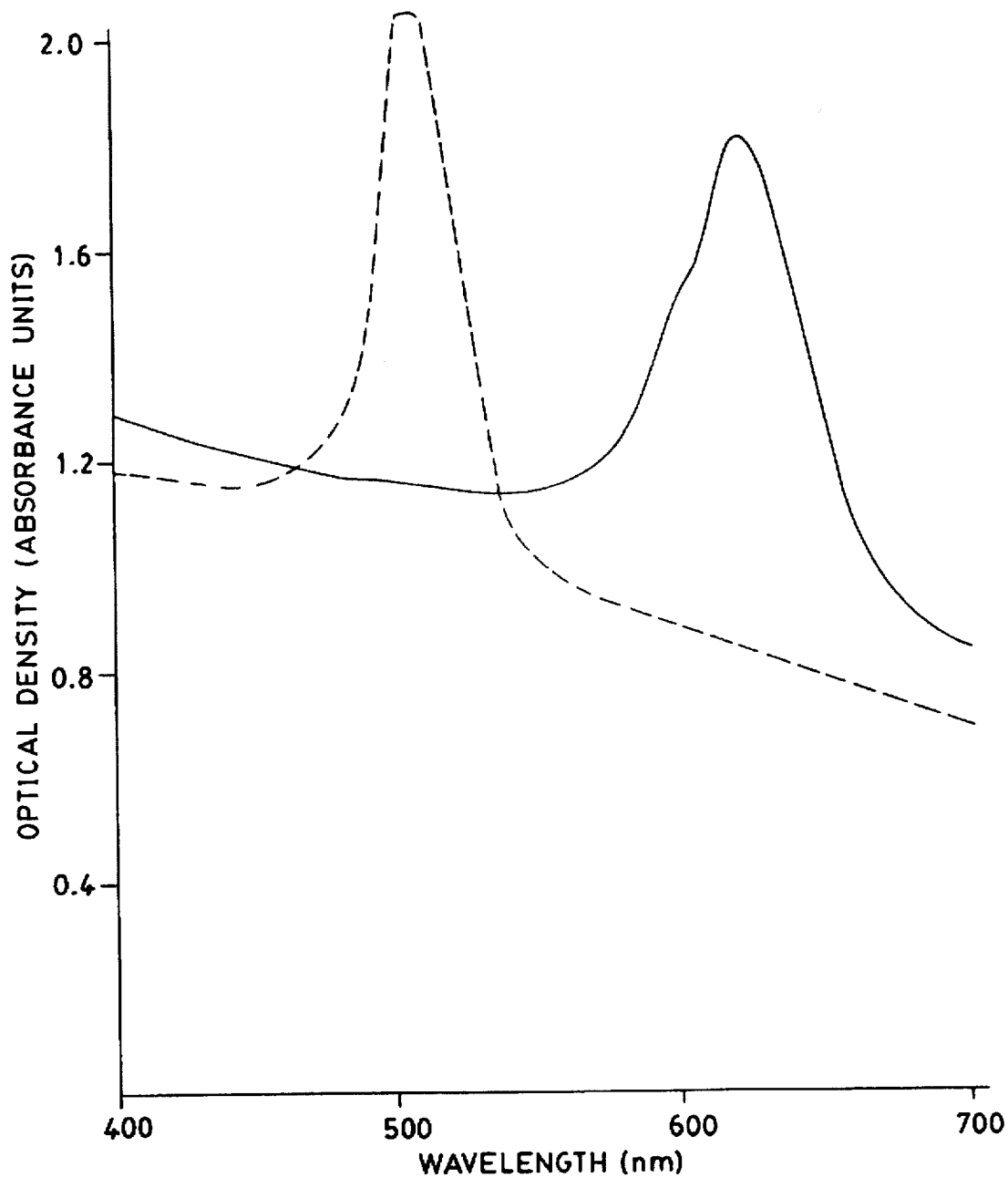
FIG. 19 shows optical density as a function of visible wavelength for a DMP-128 based holographic reflective diffuser, imaged at normal incidence with a Kr ion laser (647 nm) at a writing power of 150 mW through a 5μ polymeric diffuser film, and either processed in 90:10/ZAP solution (dashed line) or ZAP solution only (solid line)

Referring to FIG. 17, reflective holographic diffusers were prepared according to the methodologies of Example 1 (i.e., solid line) and Example 2 (i.e., dashed line). However, for exposure in each case, the angle of incidence ($\theta_i$) was changed from 0° to 38°.

The resultant reflective holographic diffuser was analyzed and measured in the manner of Example 1. The comparatively larger angle of incidence resulted in a diminished contribution from background scattering, a decrease in reflectivity at the Bragg diffraction peak to an OD of about 1.1, and an increase in $\Delta\lambda_{1/2}$ by about a factor of 2. Such observations are expected since at $\theta_i=38°$ the $\lambda_{max}$ is shifted to longer wavelengths, 572 nm (ZAP only) and 476 nm (90:10/ZAP), with the latter shifting by the expected factor of $1/\cos\Phi_i$, where $\Phi_i$ is the internal angle of incidence.

Example 4

A reflective holographic diffuser was prepared according to the methodology of Example 1. However, the holographic recording medium was imaged utilizing sequential exposures at incident angles 38° and at 0°.

The resultant reflective holographic diffuser was analyzed and measured in the manner of Example 1. Imaging sequentially with the two angles of incidence resulted in a spectrum (see FIG. 18) exhibiting a rising contribution from background scattering as a function of decreasing wavelength, but with two resolved diffraction peaks above the background. The background scattering was comparatively lower than that measured for Example 2, i.e., OD values of 0.21, 0.37, 0.57, and 0.92 at 700, 600, 500, and 400 nm, respectively. The two peaks had an OD of 1.06 and 1.05 at a $\lambda_{max}$ of 508 nm and 556 nm, respectively.

Example 5

A reflective holographic diffuser was prepared with exposure at normal incidence in accordance with the methodology of Example 1. However, the glass diffuser was replaced with a 10 mil (0.254 mm) thick polymeric diffuser comprising a uniform distribution of 5μ scattering centers.

The resultant reflective holographic diffuser was analyzed in the manner of Example 1. The visible spectrum of the reflective holographic diffuser (see FIG. 19, solid line) exhibited a more achromatic response than the holographic recording of the 25μ ground glass, with OD from background scattering increasing from about 0.85 to about 1.3 between 700 nm and 400 nm. Spectra of the resulting reflective holographic diffuser exhibited an increased level of background scattering. In particular, the background scattering had OD values of 0.84, 1.0, 1.14, and 1.29 at 700, 600, 500, and 400 nm, respectively, and a Bragg diffraction peak above the background with an OD of 1.82 at a $\lambda_{max}$ of 624 nm.

Example 6

A reflective holographic diffuser was prepared in accordance with the methodology of Example 5. However, following imaging, the exposed media was chemically processed first in a 90:10 methanol/acetic acid solution and then in the ZAP solution. The spectrum (see FIG. 19, dashed line) of the resultant reflective holographic diffuser was analyzed and observed to have OD from background scattering of 0.70, 0.88, 1.06, and 1.18 at 700, 600, 500, and 400 nm, respectively, and a Bragg diffraction peak above the background with an OD of 2.1 at $\lambda_{max}$ of 512 nm.

Diffuse Reflectivity Analysis

Figure 8:
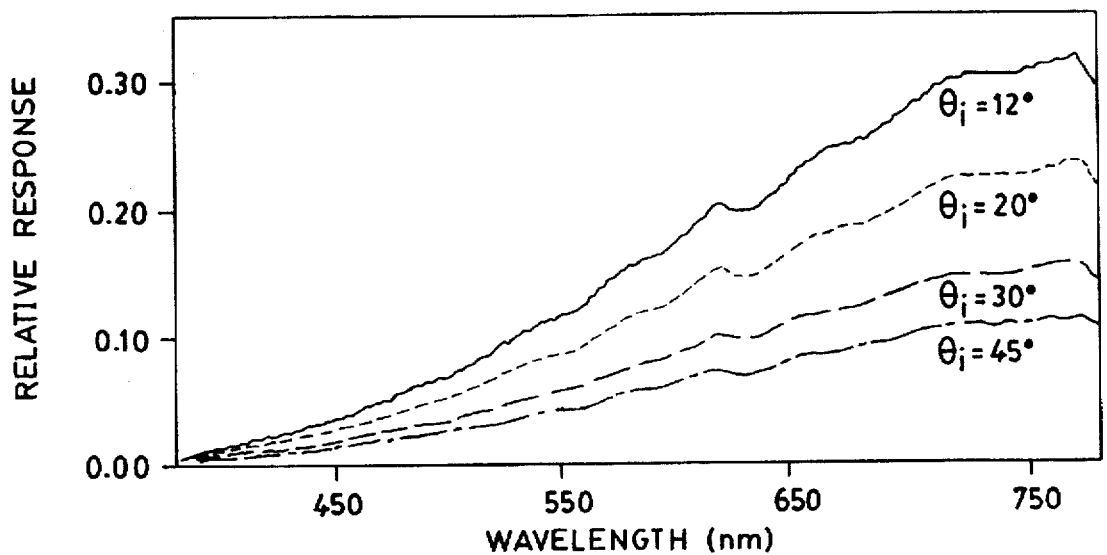
FIG. 8 is a graph showing the $R_d$ spectral response of a white tile illuminated by a tungsten point source at angles of incidence, $\theta_i$, of 45°, 30°, 20°, and 12°, and detected at normal incidence.
Figure 9:
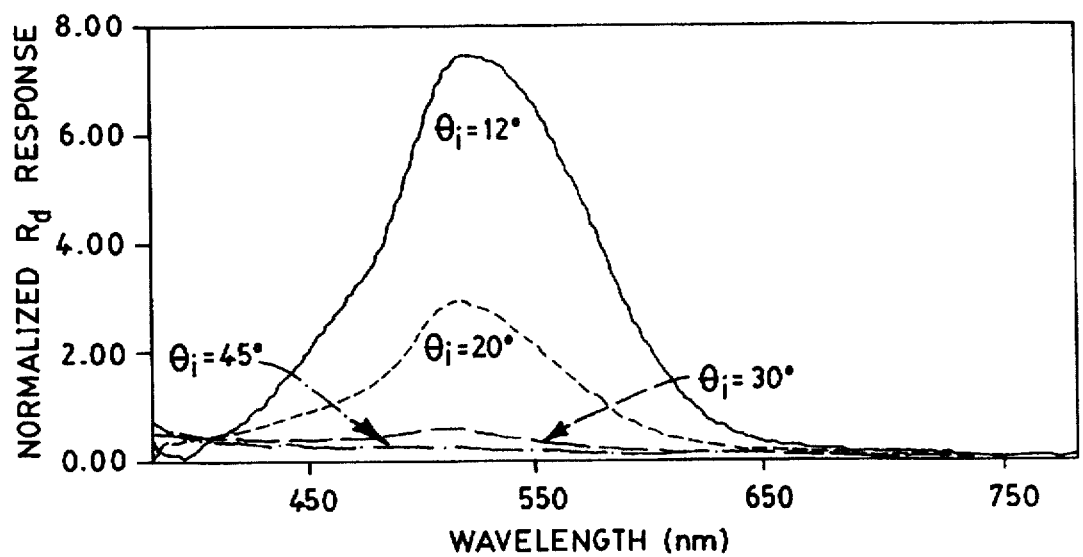
FIG. 9 is a graph showing the normalized $R_d$ spectral response of a ZAP processed holographic reflection diffuser, imaged at 38° through a 25μ glass diffuser, reconstructed with a tungsten point source at angles of incidence, $\theta_i$, of 45°, 30°, 20°, and 12°, and detected at normal incidence.
Figure 10:
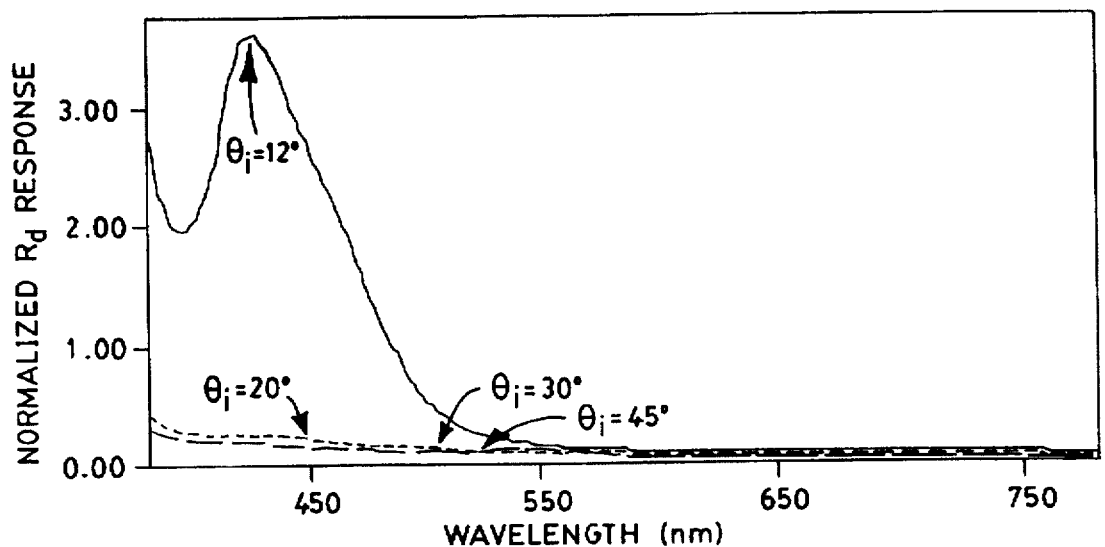
FIG. 10 is a graph showing the normalized $R_d$ spectral response of a ZAP processed holographic reflection diffuser, imaged sequentially at 38° through a 25μ glass diffuser, reconstructed with a tungsten point source at angles of incidence, $\theta_i$, of 45°, 30°, 20°, and 12°, and detected at normal incidence.
Figure 11:
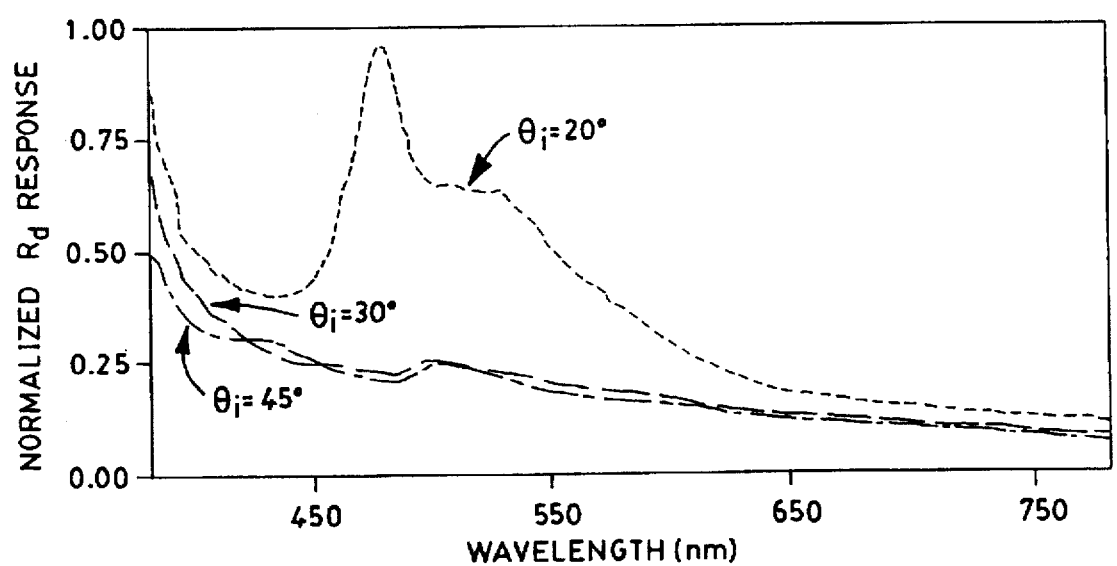
FIG. 11 is a graph showing the normalized $R_d$ spectral response of a 90:10/ZAP processed holographic reflection diffuser, imaged sequentially at 38° and 0° through a 25μ glass diffuser, reconstructed with a tungsten point source at angles of incidence, $\theta_i$, of 45°, 30°, and 20°, and detected at normal incidence.

Diffuse Reflection, $R_D$, of reflective holographic diffusers prepared generally in accordance with the methodologies of Example 1 through 6 were analyzed by illumination with a tungsten point source at the angles of incidence $\theta_i$=45°, 30°, 20°, and 12°, and measurement of the resultant spectral radiance in reflection The amount of diffuse reflection, $R_d$, for each resultant reflective holographic diffuser, was determined with the aforementioned Photo Research SpectraScan. Spectral radiance was measured at 90° to the camera lens through a collection aperture which resulted in a solid angle of detection equal to 0.25 degrees. For comparison, the $R_d$ spectral response of a white tile was determined at $\theta_i$=45°, 30°, 20°, and 12°, as a measure of the dispersion in source and detector response functions, as well as changes in radiant flux density. The results of the measurement obtained for a white tile are shown in FIG. 8. The corrected spectral radiance of the diffuser elements at each angle of incidence were subsequently calculated by a ratio to the response of the white tile as a means of "normalization". In this manner, the relative gain of the reflection hologram diffusers was determined by direct comparison to a uniformly diffuse reflecting surface. The plots exhibiting normalized $R_d$ spectral response are shown in FIGS. 9 to 13 (which correspond to Examples 3 to 6). FIG. 9 (corresponding to the sample represent by the solid line in Example 3), FIG. 12 (corresponding to Example 5), and FIG. 13 (corresponding to Example 13) are of particular note.

FIG. 9 shows the gain in diffuse reflection, of a ZAP processed reflection hologram diffuser imaged at 38° through a 25μ glass diffuser, relative to that of the white tile, for illumination angles of 45°, 30°, 20° and 12°. Gain at peak diffuse reflectivity is appreciable at illumination angles of 20° and 12° and the wavelength remains constant over the range of illumination angles investigated. A large spectral bandwidth, defined as full width at half height, is exhibited at illumination angles of 20° and 12° for the value of about 100 nm is centered in the green. At the lowest illumination angle the holographic diffuser is at least 2 times brighter than the comparison white tile over a spectral range of about 160 nm extending from indigo to orange.

Figure 12:
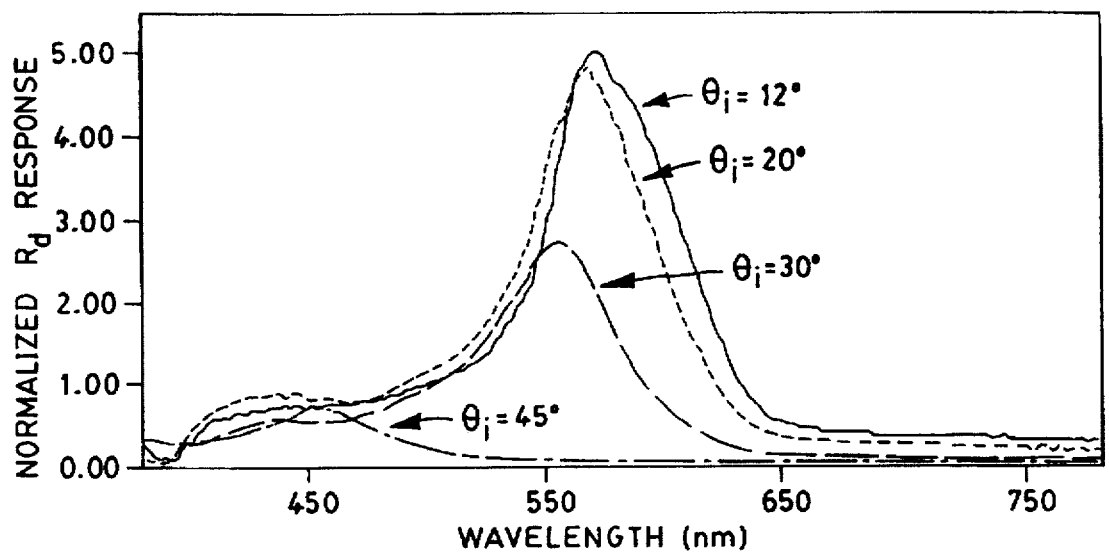
FIG. 12 is a graph showing the normalized $R_d$ spectral response of a ZAP processed holographic reflection diffuser, imaged at 0° through a 5μ polymer diffuser, reconstructed with a tungsten point source at angles of incidence, $\theta_i$, of 45°, 30°, 20°, and 12°, and detected at normal incidence.

FIG. 12 shows gain in the diffuse reflection response relative to that of the white tile at illumination angles of 45°, 30°, 20°, and 12°. The $\lambda_{max}$ for normalized $R_d$ decreased with increased illumination angle, but by less than the values expected from the cos $\Phi_i$ dependence of the Bragg equation. The gain at $\lambda_{max}$ is significant at incident illumination angles of 12°, 20°, and 30°. The brightness of the holographic diffuser is significantly greater than that of the white tile at these incident illumination angles. Reduced brightness is generally manifest only at large azimuthal viewing angles in the plane of detection perpendicular to the element.

Figure 13:
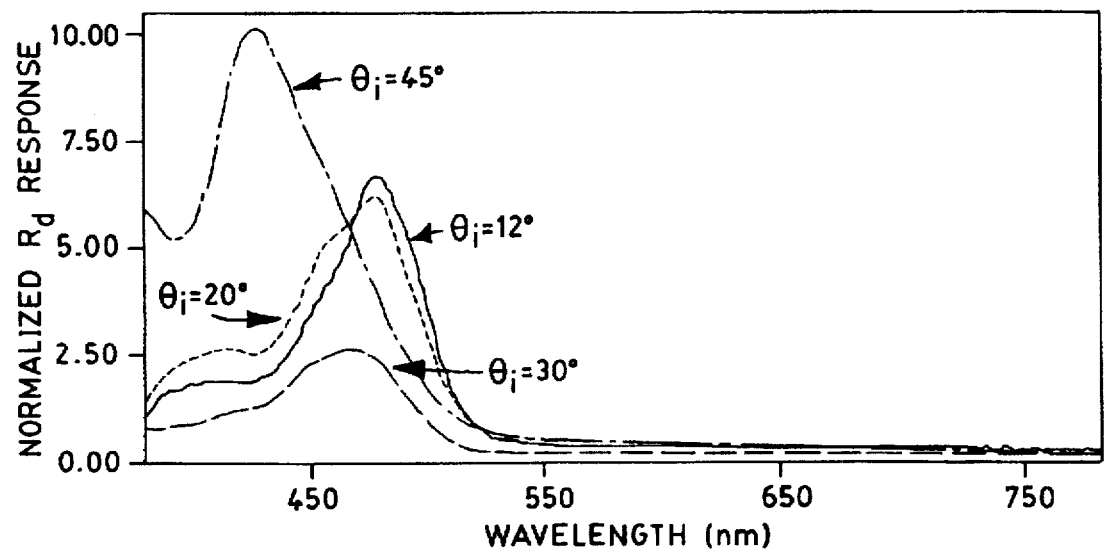
FIG. 13 is a graph showing the normalized $R_d$ spectral response of a 90:10/ZAP processed holographic reflection diffuser, imaged at 0° through a 5μ a polymer diffuser, reconstructed with a tungsten point source at angles of incidence, $\theta_i$, of 45°, 30°, 20°, and 12°, and detected at normal incidence.

FIG. 13 shows the gain of the 90:10/ZAP processed reflection hologram diffuser, relative to the gain of the white tile, at illumination angles of 45°, 30°, 20°, and 12°. The gain at $\lambda_{max}$ is quite large at all four incident illumination angles of 12°, 20°, 30°, and 45°. The $\lambda_{max}$ for normalized $R_d$, blue-shifted relative to the results shown in FIG. 12 due to the chemical processing, decreased with increased illumination angle, again by less than the expected values. Further, the normalized $R_d$ at $\Phi_i$=45° shows a gain ten-times greater at $\lambda_{max}$ than the $R_d$ of the white tile at 45°. Such viewing geometry is desirable for display applications, such as LCD flat panel displays.

Example 7

A reflective holographic diffuser was prepared according to the methodology of Example 1. However, in place of the plane mirror normally used for generating the necessary object beam, a diffraction grating ruled in aluminum (Edmund Scientific Co., No. FA3,005) was substituted. This grating is expected to have a grating period of 1200 grooves/mm and a blaze angle of 17°27', such that the optimum efficiency should be realized for 500 nm light. A sandwich comprising in order the grating, a holographic film, the film's substrate, and a ground glass diffuser were imaged through the diffuser at normal incidence with 647 nm light.

On qualitative inspection the product diffuser exhibited nonspecular diffuse reflection at normal incidence when illuminated at ~40° from the surface normal. Analysis of the visible transmission spectrum revealed a maximum reflectivity at $\lambda_{max}$ =554 nm when illuminated at normal incidence. Investigation of the angular sensitivity indicated that significant reflectivity was exhibited even at angles >40°, with only a small shift in the principal wavelength.

The embodiments of the invention in which an exclusive property is claimed are defined as follows.

We claim:

1. A volume-phase reflective holographic diffuser comprising a light-transmissive substrate; and a planar hologram layer, the planar hologram layer having an interference pattern holographically recorded therein, the interference pattern producing a diffuse light pattern in reflection when irradiated with light, the interference pattern being a product of the combination of an incident wavefront and a counterpropagating wavefront substantially coherent with said incident wavefront, the incident coherent wavefront having impinged upon the planar hologram layer from a first side, the counterpropagating coherent wavefront having impinged upon the planar hologram layer from a second side opposite the first side, the incident coherent wavefront being a diffused coherent wavefront, the counterpropagating coherent wavefront also being a diffused coherent wavefront.

2. The volume-phase reflective holographic diffuser of claim 1, wherein the diffused counterpropagating coherent wavefront is a reflected wavefront produced by reflecting said diffused incident coherent wavefront by a reflector positioned proximate said second side.

3. The volume-phase reflective holographic diffuser of claim 2, wherein the reflector has a topographically non-uniform reflective surface.

4. The volume-phase reflective holographic diffuser of claim 1, wherein the holographic diffuser is prepared from a photopolymerizable composition.

5. The volume-phase reflective holographic diffuser of claim 4, wherein said photopolymerizable composition comprises a dye sensitizer, a branched polyethylenimine, and a free-radical polymerizable ethylenically unsaturated monomer.

6. A method for making a holographic diffuser, comprising the steps of:

(a) providing a recording medium comprising a photoactivatable composition deposited on a light-transmissive substrate, the photoactivatable composition being activatable to coherent radiation such that the recordable medium is capable of recording an intereference pattern;

(b) exposing the recording medium to wavefronts of coherent radiation to produce a hologram, the wavefronts of coherent radiation comprising a diffused incident wavefront and a diffused counterpropagating wavefront substantially coherent with said incident wavefront, the diffused incident coherent wavefront impinging upon the recording medium from a first side, the diffused counterpropagating coherent wavefront impinging upon the recording medium from a second side opposite the first side, the wavefronts of diffused coherent radiation merging in the recording medium to produce a latent interference pattern therein; and (c) processing the exposed recording medium to develop the latent interference pattern.

7. The method of claim 6, wherein the diffused counterpropagating coherent wavefront is a reflected wavefront produced by reflecting said diffused incident coherent wavefront by a reflector positioned proximate said second side.

8. The method of claim 7, wherein the reflector has a topographically non-uniform reflective surface.

9. The method of claim 7, wherein the exposure of the recording medium is effected by sequentially scanning said recording element with said diffused incident coherent wavefront.

10. The method of claim 9, wherein said sequential scanning is accomplished by oscillating a beam of said coherent wavefront along a first axis to expose a region of said recording medium, and displacing sequentially said oscillating beam along a second axis normal to the first axis.

11. The method of claim 10, wherein an galvanometric oscillating mirror is used to produce said oscillating beam.

12. The method of claim 7, including a further step wherein a coherent wavefront is transmitted through a wavefront-modifying optical element, then through a source diffuser to produce said diffused incident coherent wavefront, said diffused incident coherent wavefront being a nonplanar wavefront and impinging upon said holographic recording medium at multiple angles of incidence simultaneously.

13. The method of claim 6, wherein the photoactivatable composition is a photopolymerizable composition.

14. The method of claim 13, wherein said photopolymerizable composition comprises a dye sensitizer, a branched polyethylenimine, and a free-radical polymerizable ethylenically unsaturated monomer.

* * * * *